(12) United States Patent
Turner et al.

(10) Patent No.: US 8,698,891 B2
(45) Date of Patent: Apr. 15, 2014

(54) OBJECT THICKNESS AND SURFACE PROFILE MEASUREMENTS

(75) Inventors: Justin Turner, Middletown, CT (US); Tyler Steele, Hamden, CT (US); Stephen L. Mielke, West Hartford, CT (US); Xavier M. Colonna De Lega, Middlefield, CT (US); Bruce E. Truax, Southington, CT (US); Andrew D. Meigs, Durham, CT (US)

(73) Assignee: Zygo Corporation, Middlefield, CT (US)

( * ) Notice: Subject to any disclaimer, the term of this patent is extended or adjusted under 35 U.S.C. 154(b) by 422 days.

(21) Appl. No.: 13/043,784

(22) Filed: Mar. 9, 2011

(65) Prior Publication Data

US 2012/0229621 A1    Sep. 13, 2012

(51) Int. Cl.
*H04N 7/18* (2006.01)
*G01B 11/02* (2006.01)

(52) U.S. Cl.
USPC .............. 348/135; 348/129; 348/92; 356/496

(58) Field of Classification Search
None
See application file for complete search history.

(56) References Cited

U.S. PATENT DOCUMENTS

| | | | |
|---|---|---|---|
| 4,183,672 A * | 1/1980 | Raber et al. ................... 356/601 |
| 5,398,113 A | 3/1995 | de Groot | |
| 5,402,234 A | 3/1995 | Deck | |
| 6,195,168 B1 | 2/2001 | de Lega et al. | |
| 6,650,419 B2 * | 11/2003 | Hill .............................. 356/500 |
| 6,822,745 B2 | 11/2004 | de Groot | |
| 7,057,741 B1 * | 6/2006 | Mueller et al. ................ 356/512 |
| 7,139,081 B2 * | 11/2006 | De Groot ...................... 356/503 |
| 7,315,382 B2 | 1/2008 | de Groot | |
| 7,321,431 B2 * | 1/2008 | De Groot ...................... 356/497 |
| 7,324,210 B2 | 1/2008 | de Groot et al. | |
| 7,403,289 B2 | 7/2008 | de Groot | |
| 7,468,799 B2 | 12/2008 | de Groot et al. | |
| 7,564,566 B2 | 7/2009 | de Groot | |
| 7,812,963 B2 * | 10/2010 | De Groot ...................... 356/497 |
| 2006/0192123 A1* | 8/2006 | Hamelin et al. ........... 250/341.1 |
| 2007/0043465 A1* | 2/2007 | Picciotto et al. ............. 700/121 |
| 2010/0030368 A1* | 2/2010 | Hon et al. ..................... 700/195 |
| 2010/0229398 A1* | 9/2010 | Coffin ............................ 30/50 |

OTHER PUBLICATIONS

Novak et al. "Tribology and Corrosion Evaluation Using White-Light Interferometry" ASPE Proceedings, Oct. 14-Oct. 19, 2007, Dallas Texas (2007) available at http://www.aspe.net/publications/Annual_2007/Annual_07.html.*
Erik Novak, Nelson Blewett, Tom Stout, "Interference Microscopes for Tribology and Corrosion Quantification," *Proc. of SPIE* vol. 6616, 66163B-1-B-9 (2007).
Mike Zecchino, Melinda Bullaro and Tom Stout, "Optical Profiling Provides 3D Measurement of Blades and Sharps," Applications Note 538 (Veeco Instruments, Inc; 2005).

* cited by examiner

*Primary Examiner* — Joseph Ustaris
*Assistant Examiner* — Jill Sechser
(74) *Attorney, Agent, or Firm* — Fish & Richardson P.C.

(57) ABSTRACT

Determining spatial information about a part includes positioning the part in a fixture having two reference surfaces, where the part is positioned between the two reference surfaces, imaging the two reference surfaces and opposing surfaces of the part to different locations of a multi-element detector, simultaneously acquiring images of the opposing sides of the part and the two reference surfaces using the multi-element detector, and determining spatial information about the part based on the simultaneously acquired images.

46 Claims, 23 Drawing Sheets

OBJECT THICKNESS AND SURFACE PROFILE MEASUREMENTS

BACKGROUND

This disclosure relates to measurements of object thickness and surface profiles. As part of quality control efforts, manufacturers of parts, such as razor blades and other cutting-edged devices, often rely on metrology to determine blade surface quality (e.g., surface texture) and shape (e.g., taper thickness). Preferably, the metrology should be accurate and rapid to enable immediate determination of which parts to retain and which parts to dispose.

SUMMARY

The present disclosure relates to object thickness and surface profile measurements. In one aspect, the apparatus includes a specialized fixture with mirrors which redirect light from a 3D profiling system to opposing sides of the object simultaneously. The fixture includes two additional reference surfaces which are rigidly attached to mirrors, respectively, and are in the field of view of the 3D profiling system. In a method, a known artifact is inserted in place of the object to calibrate the instrument. Once this is done, any drift in the location of the fixture with respect to the profiler is determined by measurement of the location of the reference surfaces.

In another aspect, images of the top edge of the object as viewed by the 3D profiler via the mirrors are used together with automated image analysis software to establish the location of the object edge with respect to the calculated thickness and surface profiles.

The apparatus is suited to measure thin flat or tapered parts such as razor blades using an adaptation of a 3D interference microscope or other 3D optical metrology system.

In general, in one aspect, the disclosure features a method for determining spatial information about a part, in which the method includes positioning the part in a fixture comprising two reference surfaces, where the part is positioned between the two reference surfaces, imaging the two reference surfaces and opposing surfaces of the part to different locations of a multi-element detector, simultaneously acquiring images of the opposing sides of the part and the two reference surfaces using the multi-element detector, and determining spatial information about the part based on the simultaneously acquired images.

Implementations of the method can include one or more of the following features and/or features of other aspects. For example, the part is a tapered element. The tapered element can be a razor blade.

In some implementations, imaging the two reference surfaces and opposing surfaces of the part to different locations of a multi-element detector includes deriving measurement light and reference light from a common light source, directing the measurement and reference light along different paths, where the fixture is positioned in the path of the measurement light, and combining the measurement and reference light on the multi-element detector.

In some implementations, the opposing surfaces of the part include a first surface and a second surface opposing the first surface, and imaging the opposing surfaces of the part further includes directing a first portion of the measurement light to the first surface; and directing a second portion of the measurement light to the second surface. The method can further includes directing the first portion of the measurement light along a direction of a local surface normal of the first surface, and directing the second portion of the measurement light along a direction of a local surface normal of the second surface.

In some implementations, determining the spatial information includes correcting for variations of the relative position of the fixture with respect to the detector based on calibration information. The calibration information can be determined from a calibration procedure that includes positioning a calibration artifact in the fixture, simultaneously acquiring images of opposing sides of the calibration artifact and the two reference surfaces using the multi-element detector, and determining the calibration information based on the simultaneously acquired images of the opposing sides of the calibration artifact. The calibration information can include information about the relative locations of the reference surfaces with respect to the opposing surfaces of the part. The two references and opposing surfaces of the part can be imaged to the multi-element detector using an imaging profiler and the calibration information can include information about imperfections in the imaging profiler.

In some implementations, the opposing surfaces of the part define an edge and the spatial information comprises the location of the edge with respect to other spatial information about the part. The spatial information can include the location of the edge with respect to a thickness profile of the part or with respect to surface profiles of the opposing surfaces of the part.

In some implementations, the fixture includes one or more additional reference surfaces separate from the first two reference surfaces, where the imaging includes imaging the one or more additional reference surfaces to the multi-element detector. The additional reference surfaces can include two adjacent reference surfaces having different orientations, the two adjacent reference surfaces being rigidly attached to one of the first two reference surfaces. Determining can include accounting for motion between different portions of the fixture based on the images of the two adjacent reference surfaces. The two references and opposing surfaces of the part can be imaged to the multi-element detector using an imaging profiler.

In some implementations, the imaging profiler is an interferometric imaging profiler. Imaging the opposing surfaces of the part to the multi-element detector can include reflecting light from the opposing surfaces towards the imaging profiler.

In some implementations, the spatial information includes a thickness profile of the part. Alternatively, or in addition, the spatial information includes surface profiles of the opposing sides of the part. In some implementations, the spatial information includes a thickness profile of a thin film on at least one of the opposing surfaces of the part. In some implementations, the spatial information includes a profile of an interface between the part and a first thin film on the part or an interface between the first thin film and a second thin film on the part. In some implementations, the method further includes determining a refractive index of a thin film on the part.

In another aspect, the disclosure features a method for determining spatial information about a blade, the method including simultaneously acquiring images of opposing sides of the blade, and determining spatial information about the blade based on the simultaneously acquired images, in which the spatial information comprises a thickness profile of the blade and surface profiles of the opposing sides of the blade.

In some implementations, the blade can be a razor blade. In some implementations, the spatial information includes a thickness profile of a thin film on a surface of the blade.

In another aspect, the disclosure features an optical metrology system, that includes an imaging profiler having an optical assembly and a multi-element detector, a fixture comprising two reference surfaces and configured to receive a part between the reference surfaces, the fixture being positioned relative to the optical assembly so that the optical assembly simultaneously images the two reference surfaces and opposing surfaces of the part to different locations of the multi-element detector, and an electronic processor in communication with the multi-element detector, in which the electronic processor is programmed to determine spatial information about the part based on the images of the two reference surfaces and the images of the opposing surfaces of the part.

Implementations of the system can include one or more of the following features and/or features of other aspects. For example, the fixture can include a first mirror and a second mirror, the first and second mirrors being configured to direct light from respective ones of the opposing surfaces of the part to the imaging profiler. The two reference surfaces can be separated by a space sized to receive the part. The part can be a tapered element. The tapered element can be a razor blade.

In some implementations, the opposing surfaces of the blade define an edge and the fixture is configured to orient the blade with the edge pointing towards the optical assembly.

In some implementations, the fixture includes two mirrors, each positioned to reflect light from a respective one of the opposing surfaces of the part towards the optical profiler. The two mirrors can be arranged at 90° with respect to each other. Each of the mirrors can be rigidly attached to a corresponding reference surface. The two reference surfaces can be positioned between the mirrors. The fixture can include one or more additional reference surfaces separate from the first two reference surfaces positioned so that the optical assembly images the one or more additional reference surfaces to the multi-element detector. The additional reference surfaces can include two adjacent reference surfaces having different orientations, the two adjacent reference surfaces being rigidly attached to one of the first two reference surfaces.

In some implementations, the opposing surfaces of the part are non-coplanar with the reference surfaces.

In some implementations, the imaging profiler is selected from the group consisting of scanning white light interference microscopes, imaging interference microscopes, phase-shifting interference microscopes, confocal microscopes, chromatic confocal microscopes, structured-light microscopes, focus sensors, and triangulation sensors.

In some implementations, the fixture is configured to hold multiple parts and the system includes an actuator configured to translate the fixture relative to the optical assembly.

In another aspect, the disclosure features a method for manufacturing a razor blade assembly, that includes providing a razor blade, determining spatial information about the razor blade using any of the methods described herein, and assembling the razor blade with one or more additional elements to form the razor blade assembly.

In some implementations, the method further includes providing one or more additional razor blades, determining spatial information about the one or more additional razor blades using the methods described herein, and excluding one or more of the additional razor blades from the razor blade assembly based on the spatial information.

The details of one or more embodiments of the invention are set forth in the accompanying drawings and the description below. Other features, objects, and advantages of the invention will be apparent from the description and drawings, and from the claims.

DETAILED DESCRIPTION

The present disclosure features optical systems and methods for determining surface quality and shape information of an object based on interferometric profiles of the object surfaces with respect to a common test frame. The disclosure below is organized into three sections. A first section of the disclosure relates to basic operation of an optical profiler system for determining an object's surface quality and shape information. A second section describes examples of apparatuses that utilize an optical profiler for performing measurements of a part's surface quality and shape information. A third section relates to structures and methods for employing an interferometric profiler in razor blade manufacturing.

Optical Profiler System Operation and Calibration

When performing quality control measurements of features on machined objects, one often wants to verify that the features conform to a particular standard. For example, American Society of Mechanical Engineering document Y14.5M-1994 (the "ASME Standards") defines geometric dimensioning and tolerancing (GD&T) practice in the US. The definitions contained in the ASME Standards relate closely to the way a skilled machinist would manufacture and verify parts. For a part having opposing plane parallel surfaces, specifications of interest include, for example, flatness, thickness, and parallelism (FTP).

Figure 1:
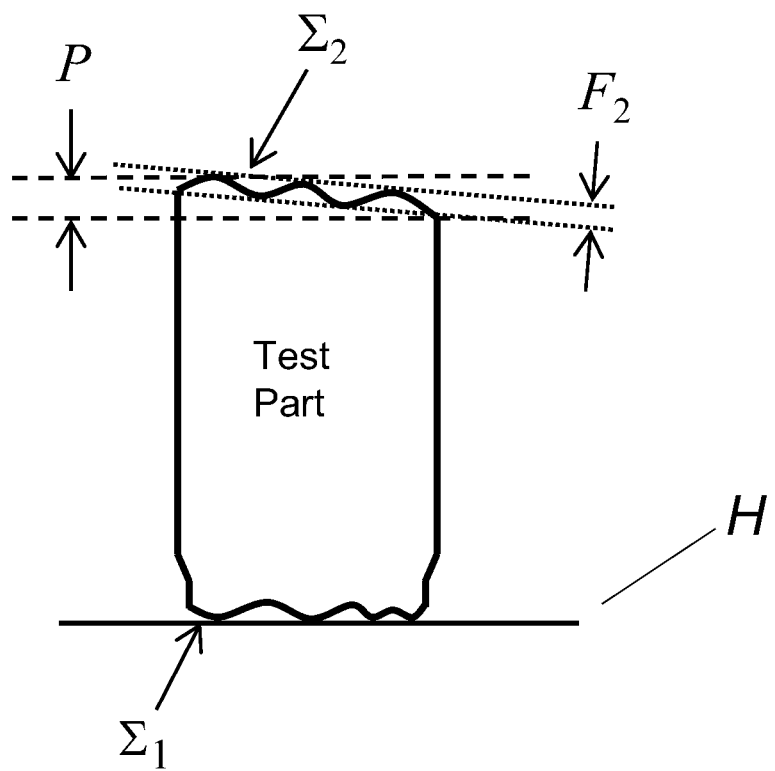
FIG. 1 is a drawing illustrating common definitions for flatness and parallelism.

An example of flatness tolerance usually specifies a zone defined by two parallel planes within which a surface must lie. Iterative fitting of two parallel planes is used to find the minimum separation encompassing all of the data points. A parallelism tolerance often specifies a zone within which a surface lies, defined by two planes both parallel to a datum plane. FIG. 1 summarizes flatness (F) and parallelism (P) for an example part having two opposing surfaces $\Sigma_2$ and $\Sigma_1$. The datum plane H is a theoretically exact plane in contact with the lower surface or a designated feature $\Sigma_1$ of the part. Parallelism is the minimum separation of two planes parallel to the datum H that contains the entire upper surface $\Sigma_2$ of the part. Evidently, the parallelism tolerance is greater than or equal to the flatness tolerance.

There are several relevant interpretations of thickness (T) consistent with GD&T. One approach to calculating thickness is to tolerance a profile with respect to the part datum H in FIG. 1. This datum-referenced profile tolerance incorporates the basic dimension from surface $\Sigma_1$ to surface $\Sigma_2$. For the purpose of sorting the part according to thickness, the measured thickness may be considered the average distances from the datum H of the two planes used to verify the parallelism of surface $\Sigma_2$ with respect to the designated surface $\Sigma_1$. Other approaches to determining thickness that do not involve a reference to a datum are also possible.

Additional measurements of interest include the orthogonality of different part surfaces, or more generally, the geometric relationship of one part surface (e.g., a planar, curved, or structured surface) to another part surface. Generally, such geometric properties can be determined by measuring positions in a common coordinate system of a plurality of points on the first surface and a plurality of points on the second surface.

An apparatus capable of determining geometrical properties of a part can make use of optical profilers to measure a height $h_{H\Sigma}$ within a restricted range $\eta$ for any given point x,y on a surface $\Sigma$ with respect to an optical profiler datum H. For example, such height measurements are characteristic of scanning height-measurement interferometers, e.g., the New-View 7000 from Zygo Corp. (Middletown, Conn.), for which $\eta$ is the scan range of 150 microns. The position and orientation of the NewView optical profiler datum are related to the starting point of the scan as well as the locations of all optical components that influence the peak fringe contrast position. Using the optical profiler to profile two part surfaces and relating the two corresponding optical profiler datums $H_1$, $H_2$ for the profiling, provides information sufficient for FTP and other such geometric part properties.

Figure 2:
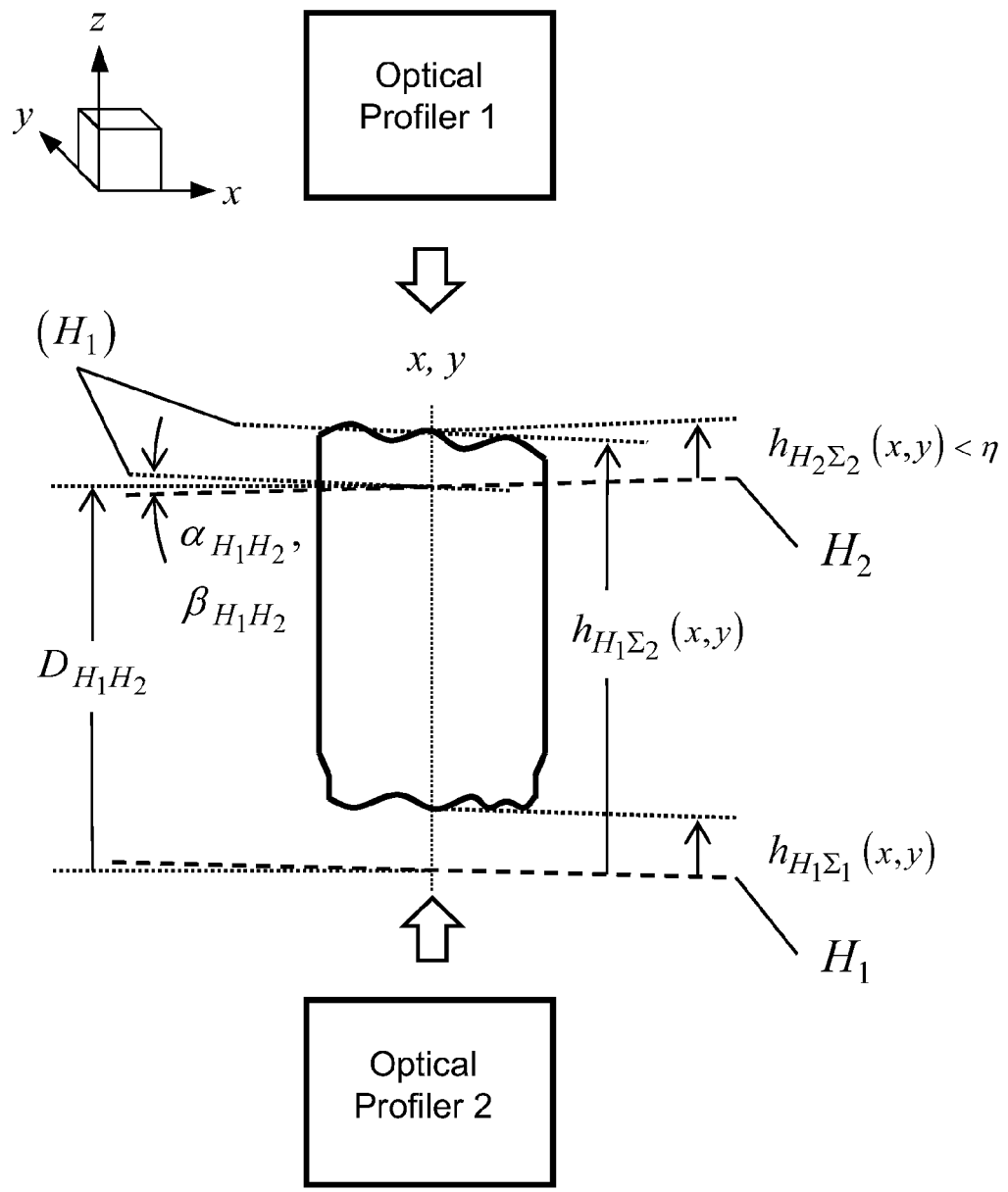
FIG. 2 is a schematic drawing of a two-sided all-optical profiler system.

FIG. 2 illustrates an all-optical FTP measurement involving two surface height profiles $h_{H_1\Sigma_1}$, $h_{H_2\Sigma_2}$ taken by an optical profiler. Although two optical profilers are shown, a single profiler can be used to measure the surface height profiles in which the optical profiler provides a split field of view for simultaneously viewing different part surfaces. The two planes labeled ($H_1$) are parallel to $H_1$. Knowing the position of and relationship between the two optical profiler datum planes $H_1$, $H_2$ by means of a prior calibration, both surface profiles can be reference to a common plane, e.g. $H_1$:

$$h_{H_1\Sigma_2}(x,y) = D_{H_1\Sigma_2} + h_{H_2\Sigma_2}(x,y) + x\tan(\alpha_{H_1H_2}) + y\tan(\beta_{H_1H_2}) \quad (1)$$

Here $D_{H_1H_2}$ is the distance from $H_1$ to $H_2$ at x=0, y=0, and $\alpha_{H_1H_2}$, $\beta_{H_1H_2}$ are the tip and tilt angles between these two planes. Knowing $h_{H_1\Sigma_1}$ and $h_{H_1\Sigma_2}$ for all x,y is sufficient to perform FTP the above-mentioned measurements.

The optical profiling system can be calibrated to determine the relative orientation of and distance between the datums $H_1$, $H_2$ corresponding to the two part surface measurements. Such calibration may be necessary when, for example, the datum positions are adjusted to accommodate varying part thickness by bringing them within the profiling range $\eta$.

Figure 3:
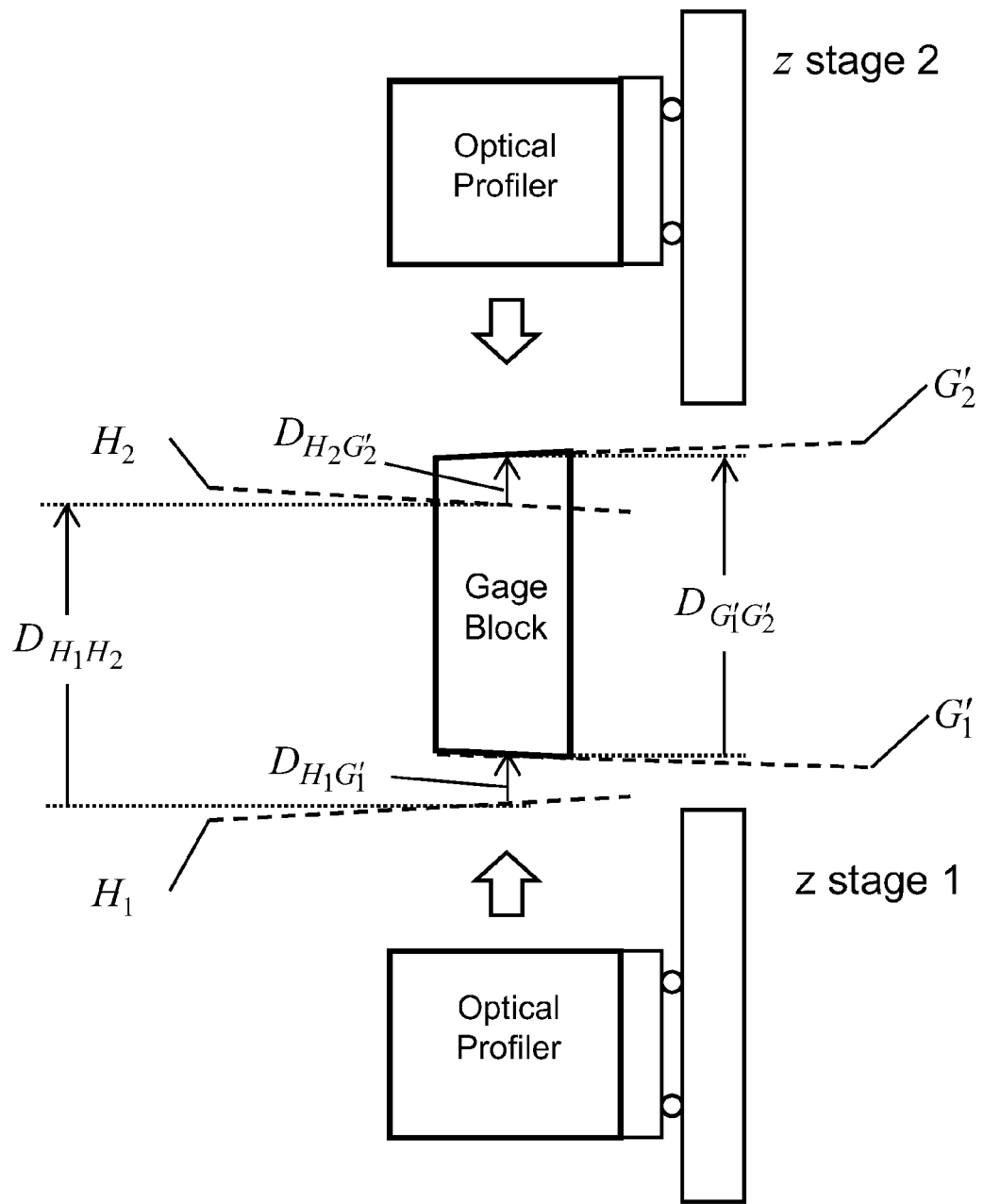
FIG. 3 is a schematic drawing of a calibration using a gage block.

One type of calibration involves standard artifacts such as certified gage blocks. The objective of the calibration is to establish the distance $D_{H_1H_2}$ and orientation angles $\alpha_{H_1H_2}$, $\beta_{H_1H_2}$ that relate the two optical profiler datum planes $H_1$, $H_2$. When using a mechanical standard artifact for calibration as shown in FIG. 3, the first step is to use a profiler to measure the lower and upper surfaces $G_1$, $G_2$. Although two optical profilers are shown in FIG. 3, a single optical profiler also can be used. The next step is to fit planes $G'_1$, $G'_2$ to the profiler data through the method of least squares, and reduce this information to distances $D_{H_1G'_1}$, $D_{H_2G'_2}$ and to orientation angles $\alpha_{H_1G'_1}$, $\beta_{H_1G'_1}$, $\alpha_{H_2G'_2}$, $\beta_{H_2G'_2}$. Knowing in advance how $G'_1$ relates to a $G'_2$ (e.g., by NIST traceable certification), $\alpha_{H_1H_2}$, $\beta_{H_1H_2}$, $D_{H_1H_2}$ can be calculated as follows:

$$\alpha_{H_1H_2} = \alpha_{H_1G'_1} - \alpha_{H_2G'_2} + \alpha_{G'_1G'_2}$$

$$\beta_{H_1H_2} = \beta_{H_1G'_1} - \beta_{H_2G'_2} + \beta_{G'_1G'_2}$$

$$D_{H_1H_2} = D_{H_1G'_1} - D_{H_2G'_2} + D_{G'_1G'_2} \quad (2)$$

Once this is accomplished, measuring the part proceeds according to Eq. (1). As shown in FIG. 3, translation stages can be used to position planes $G'_1$, $G'_2$ within profiling range $\eta$ of the optical profilers. The foregoing calibration using a mechanical standard artifact remains valid for a length of time characteristic of the overall mechanical and thermal stability of the measurement system. Further descriptions of various optical profiling systems can be found in U.S. Pat. No. 6,822,745, the contents of which are incorporated herein by reference in their entirety.

Example Optical Profiling Systems

Figure 4:
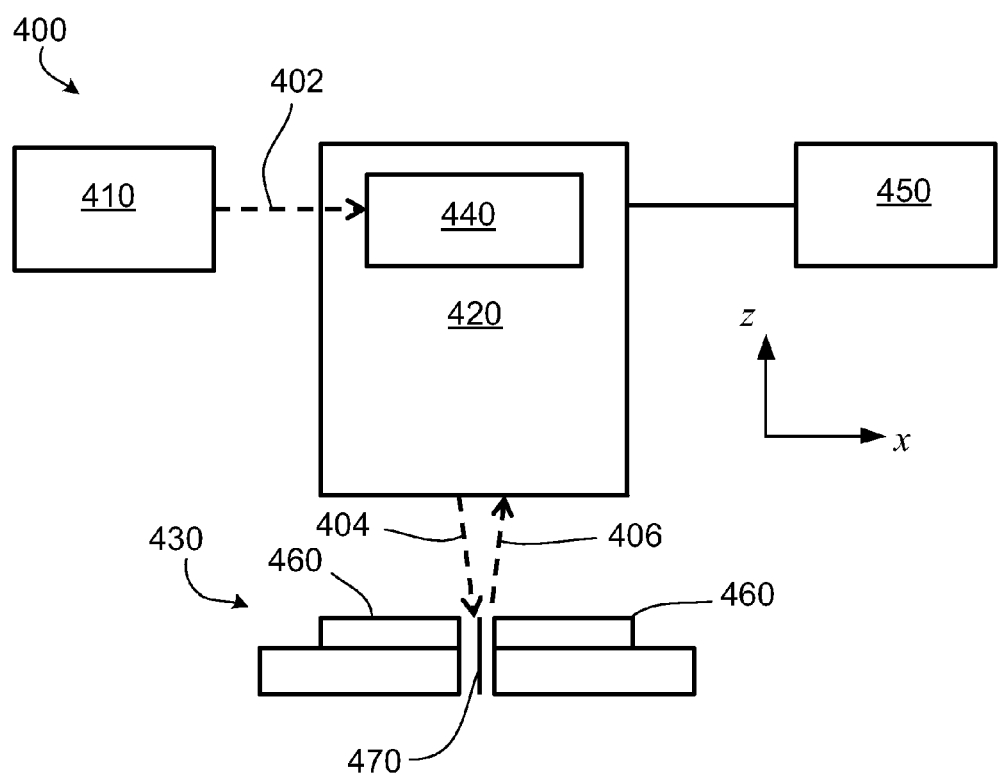
FIG. 4 is a schematic drawing of an optical profiling system.

Referring to FIG. 4, an optical profiling system 400 includes a light source 410, an optical profiler 420, a detector 440, and an electronic processor 450. A target 430 includes a target fixture 460 and test object 470. A Cartesian coordinate system is shown for reference.

During operation, optical profiling system 400 is used to measure one or more geometric properties of test object 470 based on interferometric surface profiles obtained by the optical profiler 420. In particular, source 410 provides an input beam 402 to optical profiler 420. From the input beam 402, optical profiler 420 derives a measurement beam 404 and a reference beam (not shown). The measurement beam 404 is subsequently directed towards target 430. The measurement beam 404 is reflected from test object 470 and redirected back to profiler 420 (e.g., as reflected measurement beam 406) to convey geometrical information about the surface of test object 470. At profiler 420, reflected measurement beam 406 is then combined with the reference beam to form surface interference patterns which are imaged by the pixels of a multi-element detector 440. Upon imaging the interference pattern, multi-element detector 440 generates surface interference signals that are provided to electronic processor 450. The surface interference signals are signals indicative of the beam intensity incident on detector 440.

Electronic processor 450 receives and analyzes the surface interference signals to determine geometric properties about test object 470. The geometric properties relate to a topography and/or location of test object 470 with respect to another object, e.g., a portion of optical profiler 420. In particular, the geometric properties can include, for example, flatness, thickness, parallelism, step heights, angular orientation of a first surface of test object 470 relative to a second surface of test object 470, a taper angle, and curvature among others. Electronic processor 450 also can provide displacement information about fixture 460 (e.g., drift, rotation, or tilt of fixture 460) with respect to optical profiler 420.

In general, light source 410 can include any spectrally broadband source that operates over various wavelength ranges, such as ultraviolet (UV), visible, near-infrared (NIR), and infrared (IR). Alternatively, source 410 can include multiple sources of different wavelengths, e.g., resulting from multiple light emitting diodes each operating a different wavelength. As an alternative or in combination with a broadband source, source 410 can include a narrow band or quasi-monochromatic source, typically having a high numerical aperture.

Multi-element detector 440 can be incorporated as part of optical profiler 420 or separate from optical profiler 420 and typically includes a plurality of detector elements, e.g., pixels, arranged in at least one and more generally two dimensions. In the following discussion, it is assumed without limitation that detector 440 includes a two-dimensional array of detector elements, such as a CCD includes a plurality of pixels.

For performing measurements of surface topography, suitable optical profilers include, for example, triangulation systems, which involves geometric interpretation of position using trigonometry and assuming linear light propagation, time of flight systems, which utilize light pulse or amplitude modulation to associate time delay with distance, multiple wavelength interferometers, which use a sequence of discrete wavelengths followed by fractional fringe or synthetic wavelength analysis, phase shifting interferometers, imaging interference systems, confocal microscope systems, chromatic confocal microscope systems, structured-light microscope systems, and height-scanning interferometers, which include scanning white light interferometers (SWLI), scanning MESA interferometers, scanning grazing incidence interferometers, and IR scanning interferometers. SWLI is described, for example, in U.S. Pat. Nos. 5,398,113 and 5,402,234, the contents of which are incorporated herein by reference in their entirety. An example of a SWLI instrument is the Zygo NewView 7000 available from Zygo Corp. (Middlefield, Conn.)).

Figure 5:
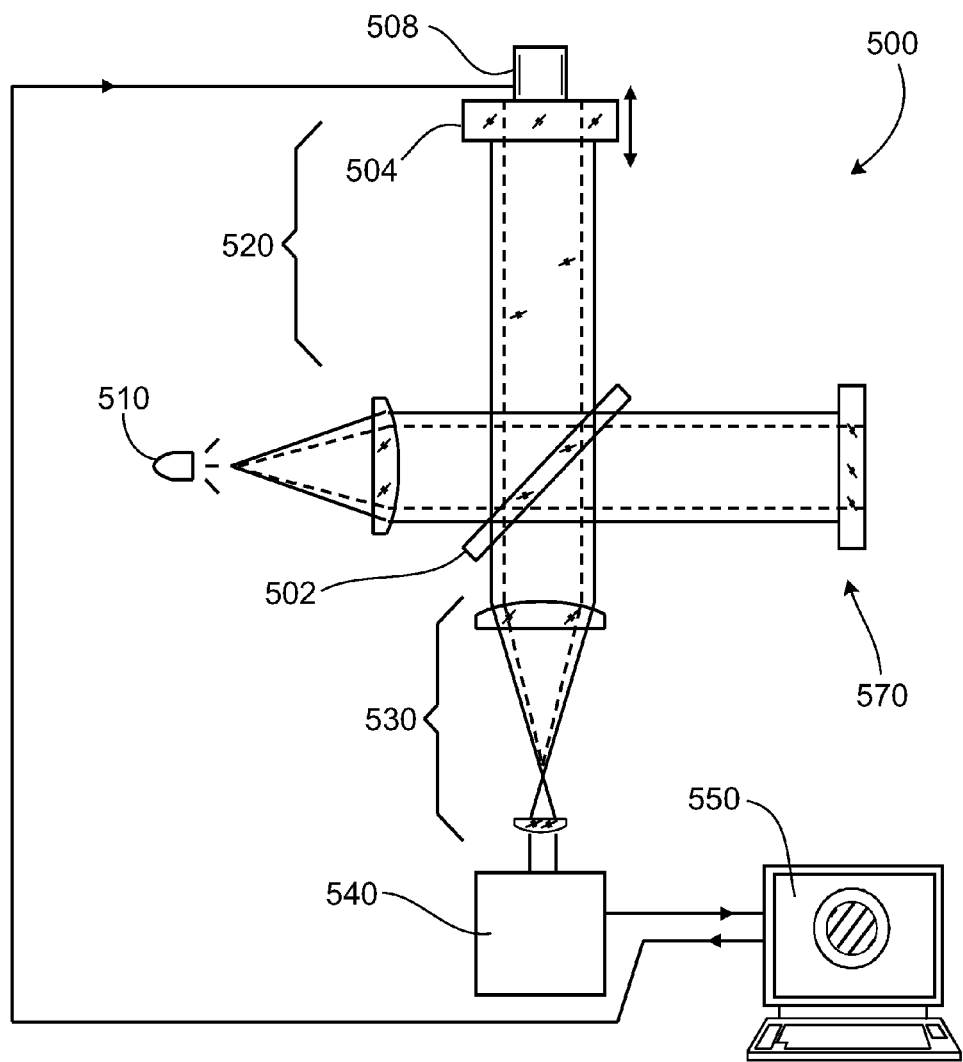
FIG. 5 is a schematic drawing of an example SWLI instrument that can be used as an optical profiler.

FIG. 5 is a schematic drawing of an example SWLI instrument 500 that can be used as an optical profiler. Light from source 510 is split by a beam-splitting element 502 to define a reference leg 520 where a reference portion of the incident light is directed toward a reference mirror 504, and a measurement leg 530 where a measurement portion of radiation is directed toward a target, and more specifically toward test object 570. Beam-splitting element 502 then recombines radiation reflected by reference mirror 504 and radiation reflected by test object 570 to produce an interferogram, which is focused by imaging optics 506 onto a multi-element detector 540, such as a CCD camera. Multi-element detector 540 records the interferometric data and sends it to electronic processor 550 for analysis. Reference mirror 504 can be mounted on a scanning mechanism 508 (such as a piezoelectric transducer or motorized stage) coupled to electronic processor 550. During operation, electronic processor 550 causes the scanning mechanism to adjust the position of the reference mirror and store the interferometric data as a function of the scan position. Alternatively, in some implementations, electronic processor 550 causes the position of a target to which the measurement portion of radiation is directed to be scanned. Various additional light shaping optical components also can be included in the instrument 500.

One or more optical datum planes H are specified for an initial starting position for reference mirror 504. As scanning mechanism 508 adjusts the position of reference mirror 504 over a scanning range ($\eta$), the plane corresponding to the zero optical path difference (OPD) position is scanned from a position of the datum planes H. When the zero OPD plane intersects a surface feature of test object 570, there is a coherence peak in the interferometric pattern recorded by one or more pixels of the multi-element detector 540. The position where the coherence peak is detected corresponds to the measured height of the surface feature relative to the corresponding datum plane. Obtaining the relative measured height for each pixel provides a surface height profile of the test object surface being measured. If the relationship between the various datum planes H is known, then each measured surface profile can be referenced to a common plane, allowing simultaneous calculation of the different geometric part properties, such as thickness, parallelism and flatness, of the object.

To determine the initial position and relative orientation of the datum planes H, the optical profiler is first calibrated. As explained above, one type of calibration involves using a mechanical standard artifact, such as a gage block. In some implementations, the orientation and relative position of the datum planes H can be adjusted to compensate for drift due to environmental perturbations and thermal instabilities. For example, in some implementations, a fixture can include fixture reference planes which the optical profiling apparatus analyzes to determine any shift in orientation or position of the datum planes from their original positions as identified with the standard artifact.

In some embodiments, the optical profiler is capable of measuring two separate surfaces of a test object simultaneously. For example, referring to FIG. 6, a portion of an optical profiling system 600 is shown in which an optical profiler 620 is used to obtain an interferometric profile of two surfaces of a test object 670. Other components of the system 600, such as the source, detector and electronic processor are omitted for clarity. A target 630 includes a specialized fixture 660 having an accommodation space 615 for accommodating a test object 670.

During operation of system 600, profiler 620 directs a coherent measurement beam towards target 630. The measurement beam can be analyzed in terms of where portions of the incident light impinge on the target. For example, the incident measurement beam can include a portion that impinges on the test object 670 as well as a portion that impinges on the fixture 660. The proportion of incident light within each portion depends on the positioning of the measurement beam.

Figure 6:
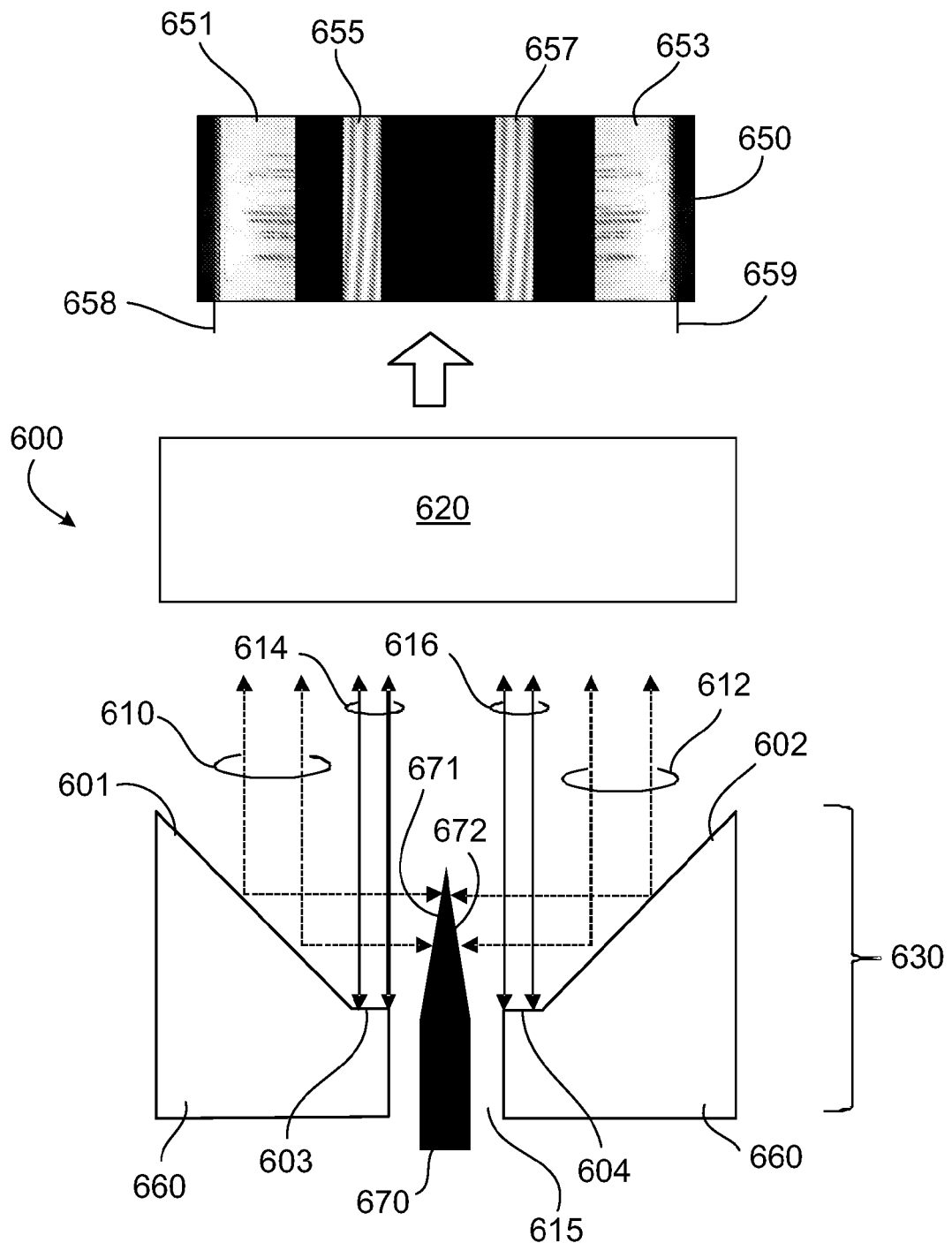
FIG. 6 is a schematic drawing of a portion of an optical profiling system.

In the example shown in FIG. 6, the incident measurement beam includes a first measurement beam portion 610 and a second measurement beam portion 612. First measurement beam portion 610 is incident on a first reflective surface 601 of fixture 660 whereas second measurement beam portion 612 is incident on a second reflective surface 602, in which both reflective surfaces are within the field of view of optical profiler 620. First reflective surface 601 and second reflective surface 602 can each include a mirror positioned on the surface of fixture 660. The mirrors may correspond to an integral contiguous component of fixture. Alternatively, mirrors may be attached to fixture 660 (e.g., using an adhesive) or formed in a surface of fixture 660 (e.g., by polishing a surface of fixture). In the present example, reflective surfaces 601, 602 extend into the page and are angled with respect to a horizontal plane. In some implementations, the angle of inclination of the reflective surfaces is about 45°.

First measurement beam portion 610 is redirected towards a first side 671 of test object 670 by first reflective surface 601 whereas second measurement beam portion 612 is redirected toward a second side 672 of test object 670 by second reflective surface 602. In some implementations, the reflective surfaces 601, 602, redirect the corresponding measurement beam portions to a local surface normal of the test object 670. As shown in FIG. 6, first side 671 of test object 670 is located substantially opposite to second side 672 of test object 670. Both first and second measurement beams portions 610, 612 then reflect (or scatter or diffract) from the surfaces of test object 670 back towards reflective surfaces 601, 602 where they are redirected to optical profiler 620.

At optical profiler 620, reflected measurement beams 610, 612 are each combined with a profiler reference beam (not shown) to produce respective interference patterns that are recorded by a multi-element detector. If profiler 620 is a scanning white light interferometer, the profiler reference beam can be derived from the same source beam as the measurement beam. An example of the interference patterns that can be generated is shown as image 650 in FIG. 6. Image 650 is a simulation of the interference patterns that would result from an optical profiling system having the arrangement shown in FIG. 6. The simulation is based in part on experimental interference images obtained using a fixture having a single fixture reference surface and a single reflective surface.

Image 650 includes first sub-image 651 and second sub-image 653. First sub-image 651 corresponds to an interference pattern produced by the combination of the profiler reference beam and measurement beams that have reflected off the left side 671 of test object 670. Similarly, sub-image 653 corresponds to an interference pattern produced by the combination of the profiler reference beam and measurement beams that have reflected off the right side 672 of test object 670. Although sub-images 651 and 653 include interference fringes, the fringe pattern is difficult to discern because of the surface texture and inclination angle of the left- and right-hand surfaces 671, 672 of test object 670.

The incident measurement beam also includes a first fixture reference beam portion 614 and a second fixture reference beam portion 616. First fixture reference beam portion 614 is incident on a first fixture reference surface 603 of fixture 660 whereas second fixture reference beam portion 616 is incident on a second fixture reference surface 604. In the present example, fixture reference surfaces 603, 604 are small strips oriented normal to the optical axis of the incident measurement beam and extending into the page. Fixture reference surfaces 603, 604 can be integrally and contiguously formed as part of fixture 660. Alternatively, fixture reference surfaces 603, 604 are separate components that are rigidly attached to fixture 660. Generally, fixture references surfaces 603, 604 have a flat, smooth topography (e.g., quarter wave peak valley) that is known prior to performing measurements of a test object.

Light rays from first fixture reference beam portion 614 reflect off from first fixture reference surface 603 back towards profiler 620. Similarly, light rays from second fixture reference beam portion 616 reflect off from second fixture reference surface 604 back towards profiler 620. The reflected fixture reference beam portions then are each combined with the profiler reference beam (not shown) to produce a corresponding interference patterns that are recorded by the multi-element detector. For example, image 650 includes a third sub-image 655 and fourth sub-image 657. Third sub-image 655 corresponds to an interference pattern produced by the combination of the profiler reference beam and fixture reference beam portion reflecting off from the first fixture reference surface 603. Similarly, fourth sub-image 657 corresponds to an interference pattern produced by the combination of the profiler reference beam and fixture reference beam portion reflecting off from the second fixture reference surface 604.

In some implementations, the first and second sub-images 651, 653 are analyzed to determine the surface profile of the two imaged sides of test object 670. In particular, interferograms are produced and detected as a reference mirror of the profiler 620 scans through the plane of zero OPD, thus allowing a surface profile of the left- and right-hand sides 671, 672 of test object 670 to be obtained.

In some implementations, the first sub-image 651 and second sub-image 653 are analyzed to provide information about a thickness of test object 670. For example, the interference patterns can be analyzed to obtain surface height profile information for the left side 671 and right side 672 of test object 670. The surface height profile information then can be referenced with respect to corresponding optical profiler datum planes H to determine test object thickness. As explained above, the optical profiler datum planes can be established during calibration of optical profiler 620 using a mechanical standard artifact, such as a gage block, prior to analyzing test object 670.

Occasionally, various environmental perturbations can cause drift in the position of the optical profiler datum planes. The perturbations include, for example, thermal and mechanical instabilities in the optical profiling system 600 that lead to erroneous thickness and/or height measurements. The drift can be compensated based on the interferometric profiles obtained from first fixture reference surface 603 and second fixture reference surface 604. During a calibration step, the first fixture reference surface 603 and second fixture reference surface 604 are interferometrically profiled to obtain corresponding surface height profiles. The surface height profiles of the first fixture reference surface 603 and second fixture reference surface 604 are correlated with initial positions of a first optical profiler datum plane $H_1$ and a second optical profiler datum plane $H_2$, respectively. For example, the difference between a first optical profiler datum plane $H_1$ and a surface height profile of the first fixture reference surfaces is set as a base difference. This base difference incorporates any imperfections that may exist in optical profiler 620 prior to analyzing test object 670. Imperfections can include, for example, systematic biases in the measured heights. There are a number of potential causes of such imperfections, such as optical aberrations and deviations from flatness for the internal reference surface.

As the optical profiler datum plane $H_1$ drifts due to environmental perturbations, the difference between the datum plane $H_1$ and the surface height profile of the first fixture reference surfaces changes. An electronic processor coupled to optical profiler 620 can record this change and reposition optical profiler 620 to re-establish the initial position of the optical profiler datum plane $H_1$. In addition to correcting for imperfections in optical profiler 620, the calibration artifact also can be used to establish a relative location of fixture reference surfaces 603, 604 with respect to the sides of test object 670.

In some implementations, the interferometric images obtained by optical profiler 620 can be used to identify edges of test object 670 or edges of fixture 630. For example, an electronic processor (not shown) can include image processing software that configures the processor to identify an outermost edge 658 of sub-image 651 and an outermost edge 659 of sub-image 653. The electronic processor then can use this edge information as lateral points of reference in reconstructing surface and thickness profiles of object 670. For example, the processor may identify the topmost edge of object 670. Alternatively, or in addition, the electronic processor can be configured to identify the edges of fixture reference surface sub-images 655, 657. Knowing the position of the fixture reference surface edges allows the system 600 to determine the lateral displacement of an object positioned in a gap between the reference surfaces.

Figure 7:
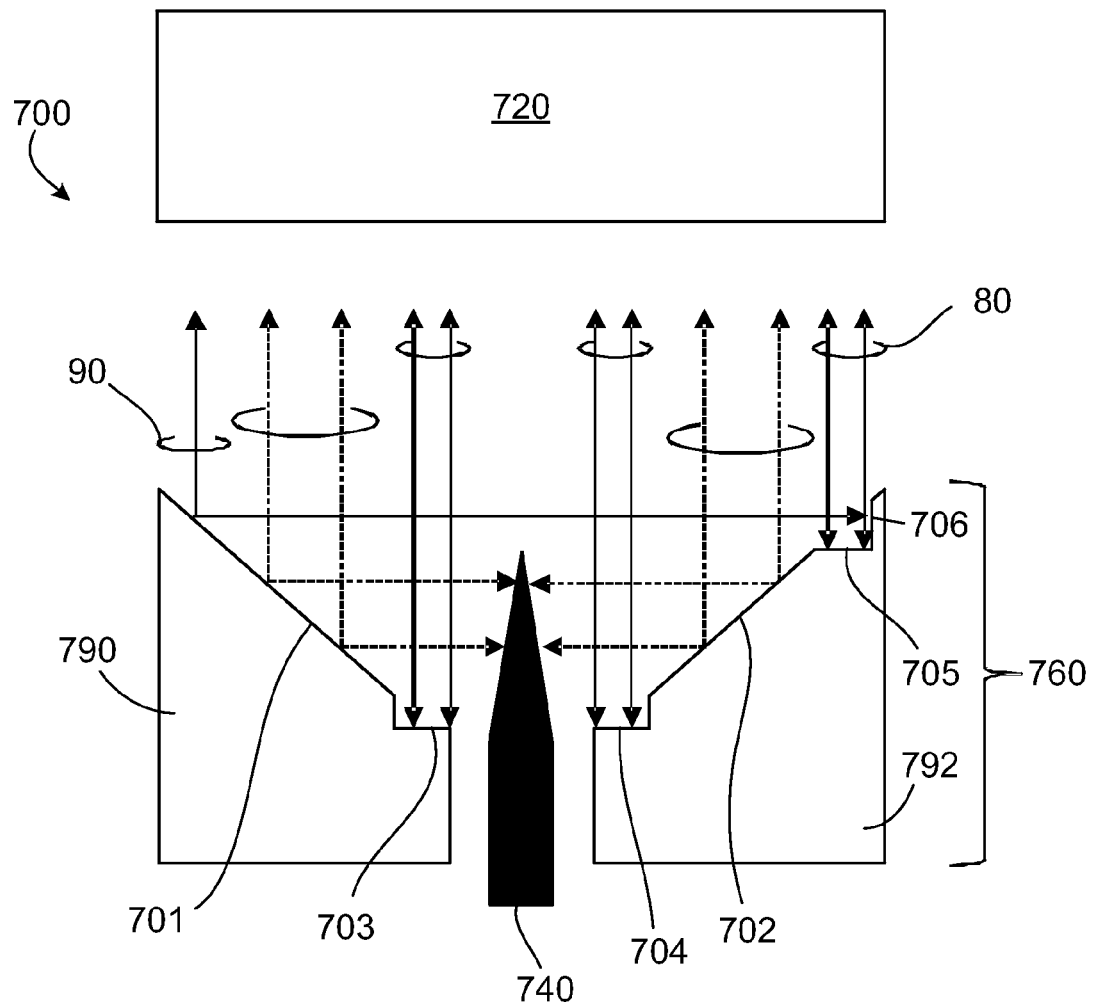
FIG. 7 is a schematic drawing of a portion of an optical profiling system.

In some embodiments, one or more additional fixture reference surfaces are included with a fixture for a test object. For example, referring to FIG. 7, a portion of an optical profiling system 700 is shown in which a fixture 760 includes a third fixture reference surface 705 and fourth fixture reference surface 706 built into a reflective surface 702 (e.g., a mirror) of fixture 760. Reflective surface 701 also may include additional fixture reference surfaces (not shown). Reflective surface 701 and reflective surface 702 are positioned on first fixture part 790 and second fixture part 792, respectively.

During calibration with a reference artifact, the relative positions of fixture reference surfaces 704 and 705 with respect to the optical datum H are recorded by an electronic processor (not shown) coupled to optical profiler 720. Any variation in the relative positions of fixture reference surfaces 704 and 705 (e.g., when a test object or other part is analyzed by optical profiler 720 after calibration) would indicate a rotation of second fixture part 792 about an axis perpendicular to the figure. This rotation is then taken into account in analysis of surface height profiles and thickness measurements of test object 434. Rotation of second fixture part 792 about a horizontal axis within the plane of figure is similarly monitored by measuring the tilt with respect to the datum H of fixture reference surfaces 704, 705. To obtain a relative position of third fixture reference surface 705, a portion 80 of an incident measurement beam is reflected from fixture reference surface 705 back towards optical profiler 720. At profiler 720, the reflected portion 80 is combined with a reference beam to produce an interferometric profile of fixture reference surface 705. An electronic processor then can analyze the interferometric profile to obtain a relative surface height profile of the fixture reference surface 705.

In some implementations, a portion of the measurement beam is used to provide a measure of distance between reflective surfaces 701, 702. For example, referring to FIG. 7, a ray 90 (which corresponds to a portion of the incident measurement beam) is incident on reflective surface 701. Ray 90 then is redirected toward fourth fixture reference surface 706 where ray 90 is reflected back to mirror 701 and then to profiler 720. During calibration of system 700, the relative positions of first fixture reference surface 703 and fourth fixture reference surface 706 is recorded (e.g., by an electronic processor coupled to optical profiler 720). Any change in the relative position of the first and fourth fixture reference surfaces then indicates a sideways motion of second mirror 702 with respect to first mirror 701. This motion also can be taken into account when determining a thickness of test object 740.

Figure 8:
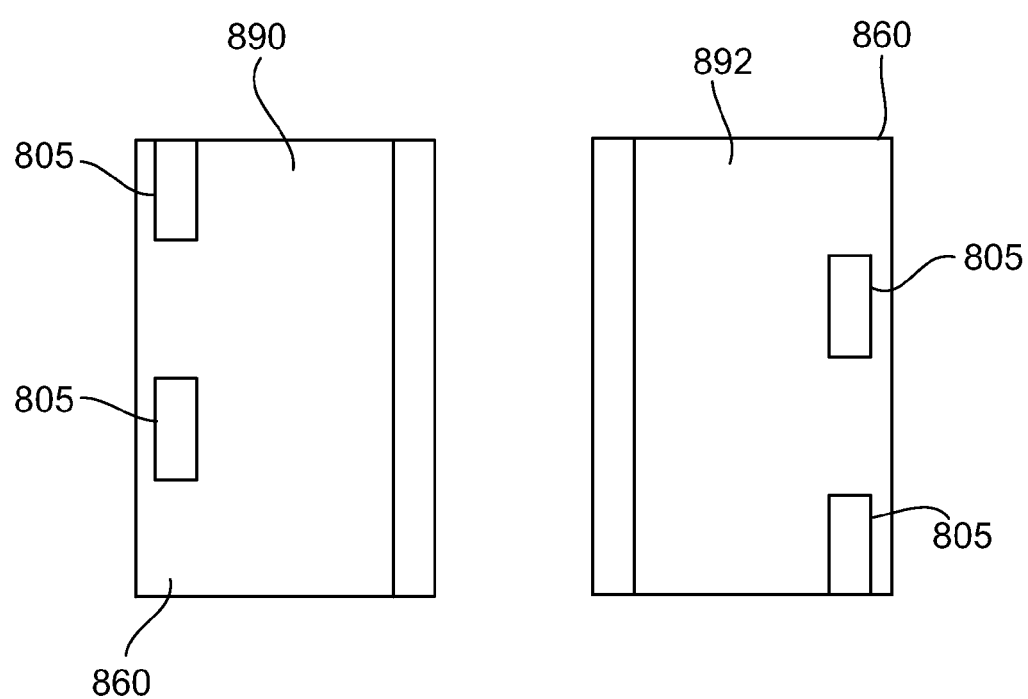
FIG. 8 is a schematic diagram of a top view of a target fixture.

In some embodiments, it is advantageous to monitor other motions of the system including the motion of the first fixture part. To perform such monitoring, additional fixture reference surfaces can be incorporated into first fixture part 790, e.g., in the reflective surface 701. The additional fixture reference surfaces can be arranged similar to fixture reference surfaces 705, 706, but would be located at different positions along an axis perpendicular to the plane of FIG. 7. For example, referring to FIG. 8, an image of a fixture 860 viewed from above (e.g., from the perspective of a microscope objective of an optical profiler) is shown where the fixture reference surfaces 805 on fixture reference part 890 are located opposite to and offset from fixture reference surfaces 805 on fixture reference part 892.

FIGS. 9-13 show example images of a fixture and test object that can be used in a system for determining surface quality and shape information of the test object based on interferometric profiles. In the examples of FIGS. 9-12, the test object being profiled is a thin blade element where a small portion of the upper edge of the element is positioned between two opposing mirror surfaces.

Figure 9:
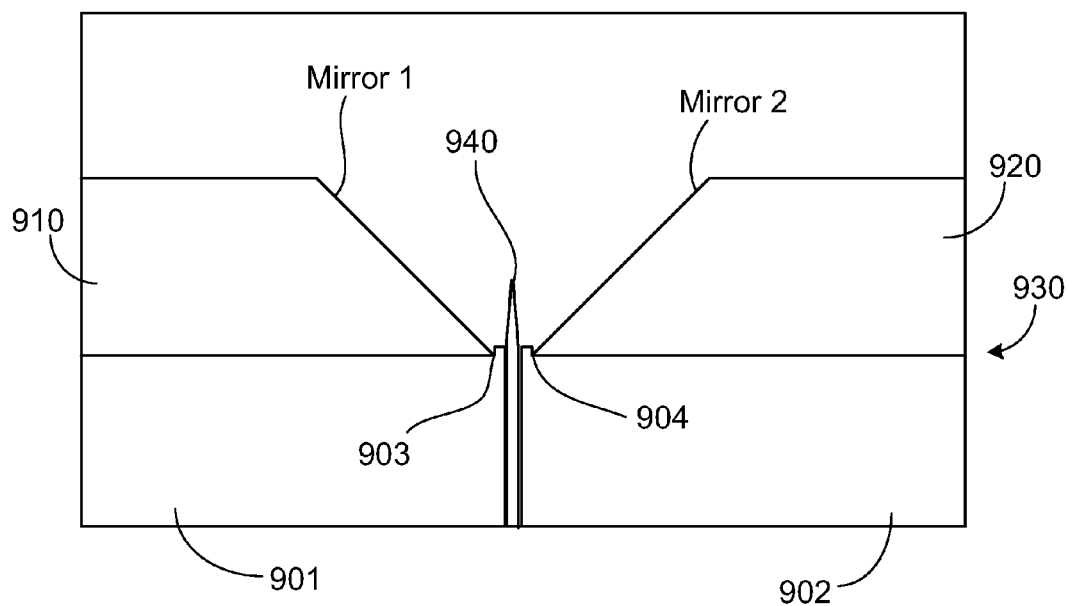
FIG. 9 is a schematic diagram of a target fixture.

In particular, FIG. 9 is a schematic diagram of an example fixture 930 that includes a first fixture part 901, on which a first mirror 910 is mounted, and a second fixture part 902, on which a second mirror 920 is mounted. A test object 940 is located between the first fixture part 901 and the second fixture part 902 with a portion of the test object 940 positioned between mirrors 910 and 920. First fixture part 901 includes a first fixture reference surface 903 located adjacent to test object 940 and a corner of mirror 910. Similarly, second fixture part includes a second fixture reference surface 904 located adjacent to test object 940 and a corner of mirror 920.

Figure 10:
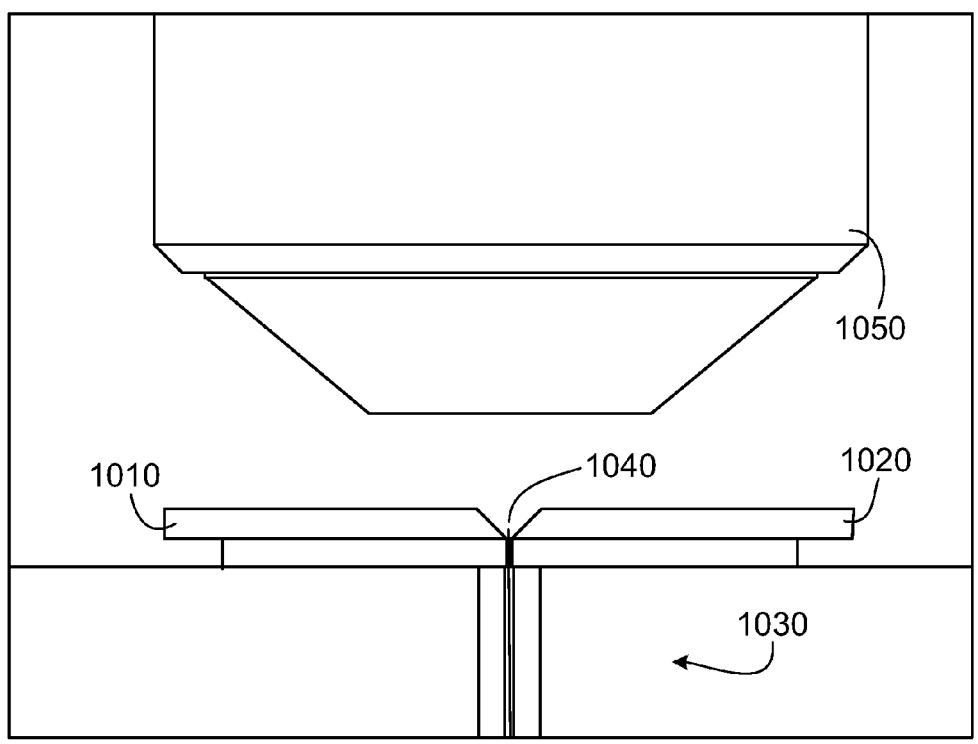
FIG. 10 is a schematic diagram of a target fixture and microscope objective.

FIG. 10 is a schematic diagram of an example fixture 1030 and microscope objective 1050, where the microscope objective 1050 is a part of an optical profiler (not shown) for obtaining interferometric profiles of a test object 1040 positioned between mirrors 1010 and 1020 of fixture 1030.

Figure 11A:
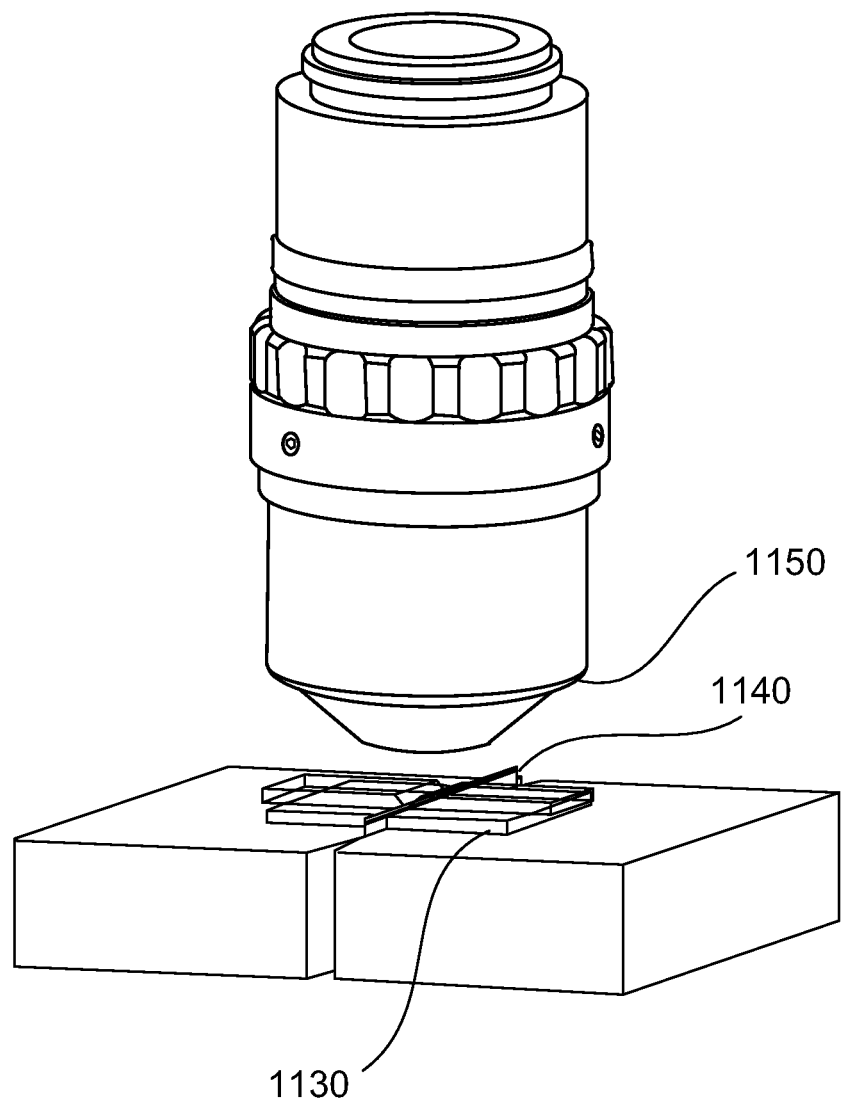
FIG. 11A is a schematic diagram illustrating a perspective view of a target fixture and microscope objective.
Figure 11B:
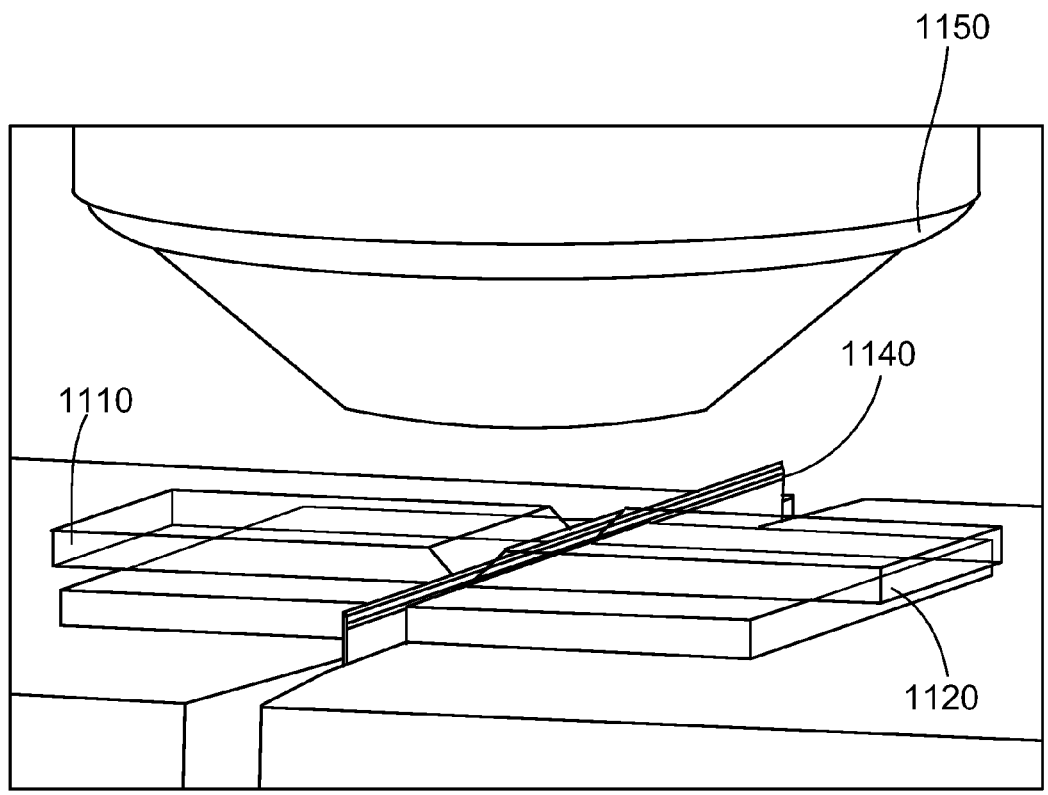
FIG. 11B is a magnified perspective view of the target fixture and microscope objective shown in FIG. 11A.

FIG. 11A is a schematic diagram illustrating a perspective view of an example fixture 1130 and microscope objective 1150, where the microscope objective 1150 is part of an optical profiler (not shown) for obtaining interferometric profiles of a test object 1140 positioned between mirrors 1110 and 1120 of fixture 1130. FIG. 11B is a magnified perspective view of the example fixture 1130 and microscope objective 1150 shown in FIG. 11A.

Figure 12:
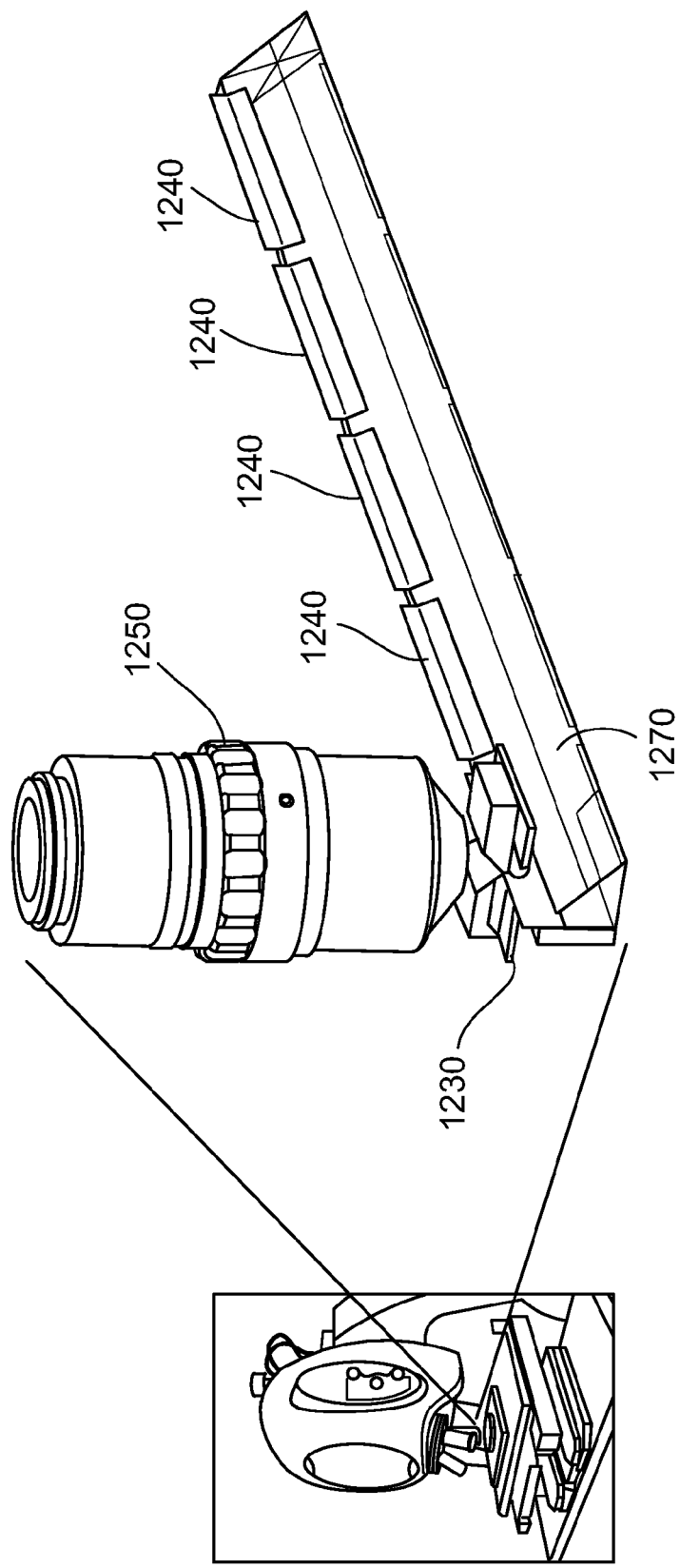
FIG. 12 is a perspective view of a target fixture and microscope objective.

FIG. 12 is a perspective view of an example fixture 1230 and microscope objective 1250, where multiple test objects 1240 are fastened to a moveable shuttle 1270. As shuttle 1270 moves through a gap in the stationary fixture 1230, the test objects 1240 are positioned beneath objective 1250 allowing interferometric profiles of each test object to be obtained. The interferometric profiles then can be used to determine surface and shape information about each test object. In some implementations, the fixture and objective are moveable and the shuttle is stationary. The inset of FIG. 12 shows an example stage on which the shuttle and fixture would be mounted as well as an example microscope/optical profiler that could be used to obtain the interferometric profiles of a test object's surfaces.

Figure 13:
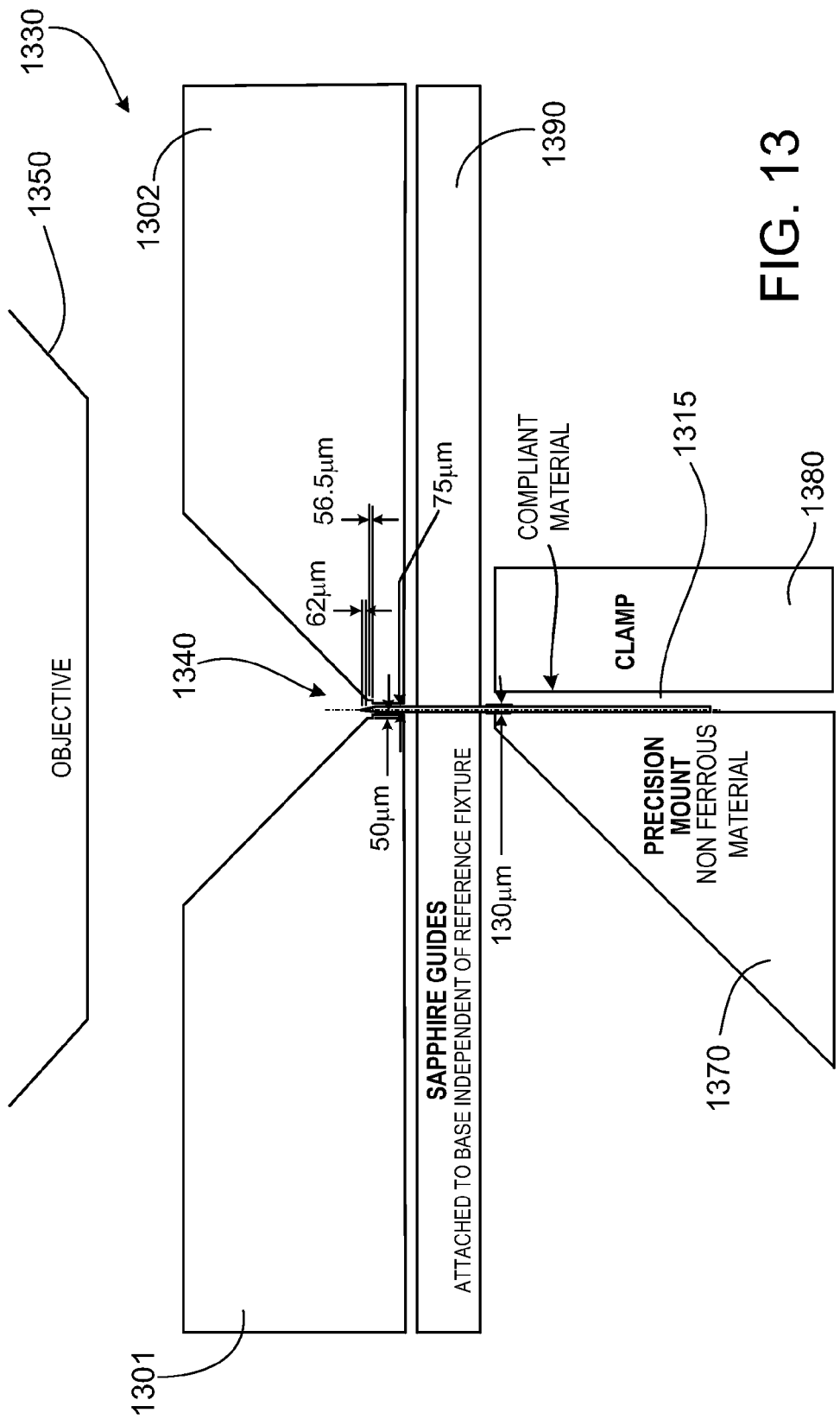
FIG. 13 is a schematic diagram of a cross-section of a target fixture and objective.

FIG. 13 is a schematic diagram of a cross-section of an example fixture 1330 and objective 1350 where a lower portion of test object 1340 is secured in place by mounting components that include a precision mount 1370 and a clamp 1380. A compliant material 1315, such as foam, cloth, or rubber, is placed between clamp 1380 and test object 1340 to help fix the test object 1340 in place and prevent damage. The precision mount 1370 may be formed from a non-ferrous material to avoid attraction of metallic particles which can build up over time and prevent the test part from properly contacting the precision mount. Additionally, a guide 1390 is located between the mounting components and fixture 1330 to ensure the test object 1340 passes through the gap in fixture 1330 without contacting the sides of fixture 1330. The guide may be formed from sapphire or other hard, durable, smooth material and is attached to a base (not shown) that is independent of fixture 1330. By using a hard and durable material for the guide, wear that results from the test part coming into contact with the guide can be minimized. In the example shown in FIG. 13, the thickness of test object 1340 is about 130 µm. The distance between a left side of test object 1340 and a first fixture part 1301 is about 50 µm whereas a distance between a right side of test object 1340 and a second fixture part 1302 is about 75 µm. Each reference fixture surface is positioned about 56.5 µm below the bottom edge of the corresponding mirror. The portion of test object 1340 that extends into an area between mirrors is about 62 µm.

In some instances, the width of the fixture reference surfaces is too small and may be partly obscured by shadowing due to the vertical edge of an adjacent reflective surface. In addition, the location of the fixture reference surfaces can, in some implementations, reduce the allowable gap for the part under test.

Accordingly, in some embodiments, the fixture reference surface is moved from between the reflective surfaces of the fixture and the part under test to a position at one end of the field of view. The positions of the reflective surfaces in these embodiments do not change. As a result of moving the position of the fixture reference surface, it is possible to obtain a wider gap for the part under test and expand a size of the reference area.

Figure 14:
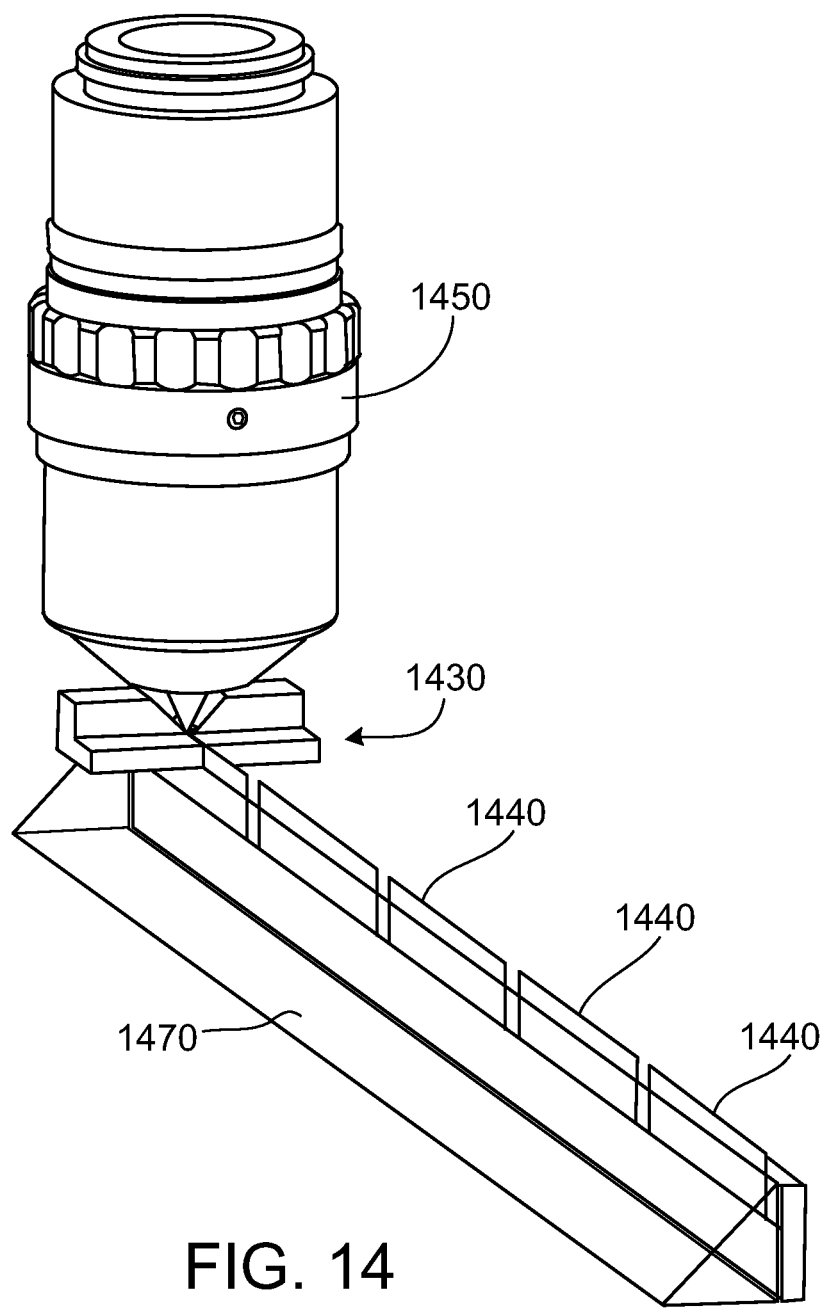
FIG. 14 is a perspective view of a target fixture, a microscope objective, and a shuttle.
Figure 15:
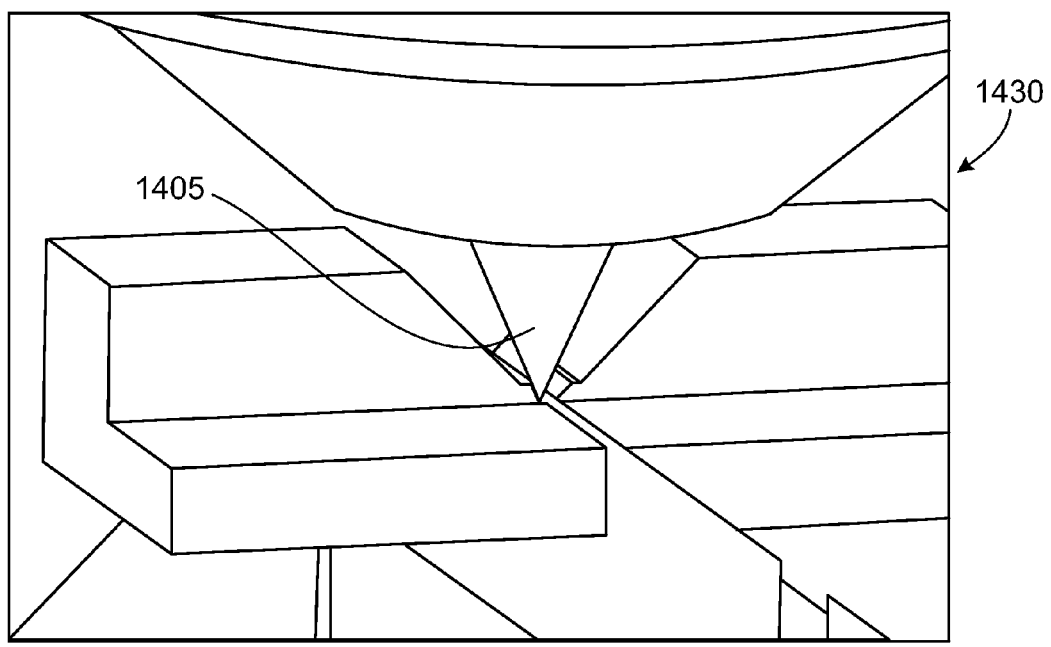
FIG. 15 is an expanded view of target fixture, objective and shuttle of FIG. 14.
Figure 16:
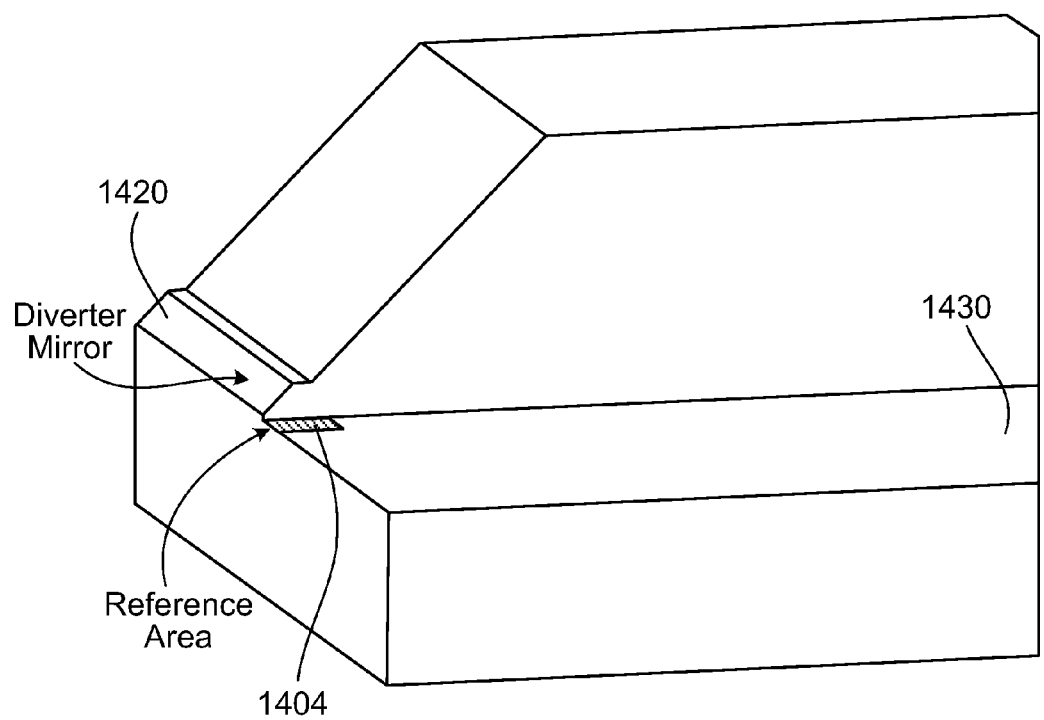
FIG. 16 is an expanded view of a right side of target fixture of FIG. 14.

FIG. 14 is a perspective view of an example fixture 1430, a microscope objective 1450 for use in an optical profiler (not shown), and a shuttle 1470 for moving test objects 1440 into a fixture gap and beneath objective 1450. FIG. 15 is an expanded view of FIG. 14 showing fixture 1430 and an incident measurement beam 1405 from objective 1450. FIG. 16 is an expanded view of a right side of fixture 1430. Fixture 1430 includes stepped reflective surfaces (e.g., mirrors) 1410, 1420 arranged on either side of the gap. A first fixture reference surface 1403 is located along a first side of mirror 1410 such that an edge of fixture reference surface 1403 closest to the gap is aligned with an edge of mirror 1410 closest to gap. Similarly, a second fixture reference surface 1404 is located along a first side of mirror 1420 such that an edge of fixture reference surface 1404 closest to the gap is aligned with an edge of mirror 1420 that is closest to the gap (see FIG. 16).

Figure 17:
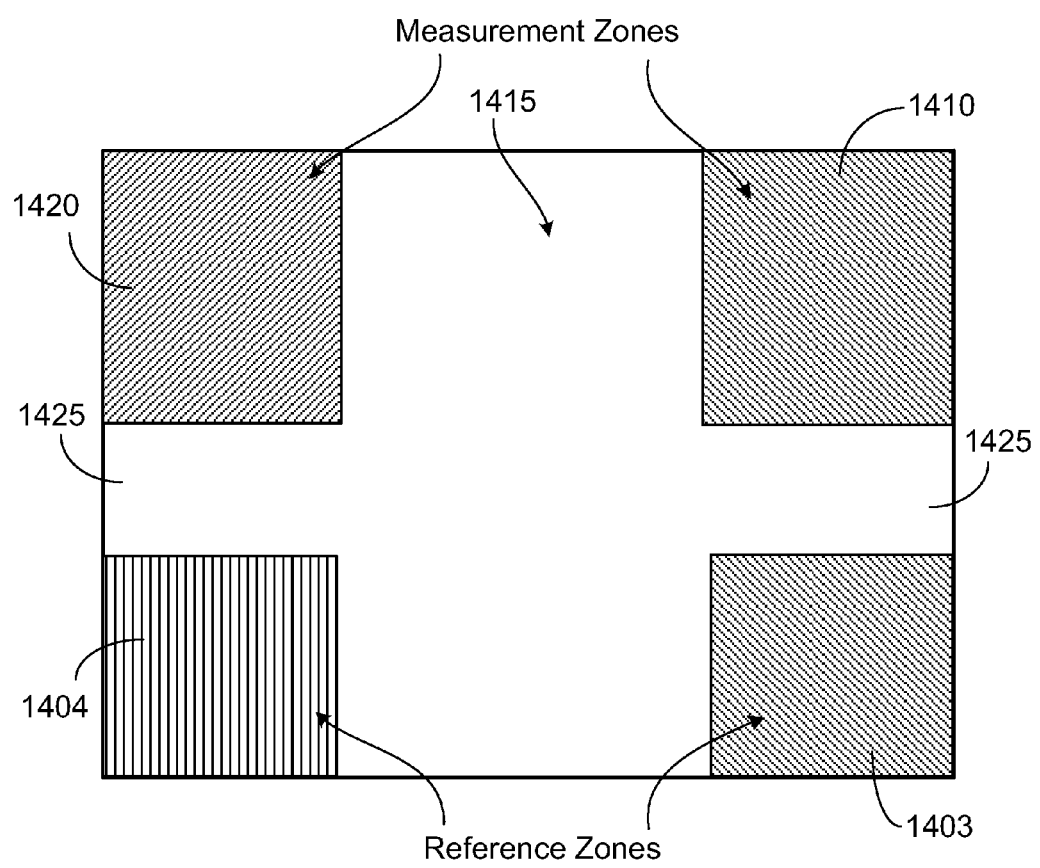
FIG. 17 is a schematic diagram of a top view of a target fixture.

FIG. 17 is a schematic representation of a microscope's field of view of fixture 1430 shown in FIG. 14. As shown in FIG. 17, the innermost edges fixture reference surfaces 1403, 1404 closest to gap 1415 are aligned with the innermost edges of reflective surfaces 1410, 1420, respectively. In the present example, an intermediate zone or region 1425 is located between the mirrors and fixture reference surfaces on either side of fixture 1430. The intermediate zone 1425 is where the measurement beam light cone from objective 1450 is divided between the mirror and reference surface area. The intermediate zone 1425 is not used for metrology.

In some embodiments, the reference fixture surfaces are located outside a region of interest of a test object, e.g., outside of the field of view of a microscope objective. In such cases, additional reflective surfaces may be used to direct incident measurement beam portions towards the fixture reference surfaces and back to an optical profiler. By moving the fixture reference surface away from the field of view, a larger space between a test object and the reflective surfaces can be used without altering the calibration process.

Figure 18:
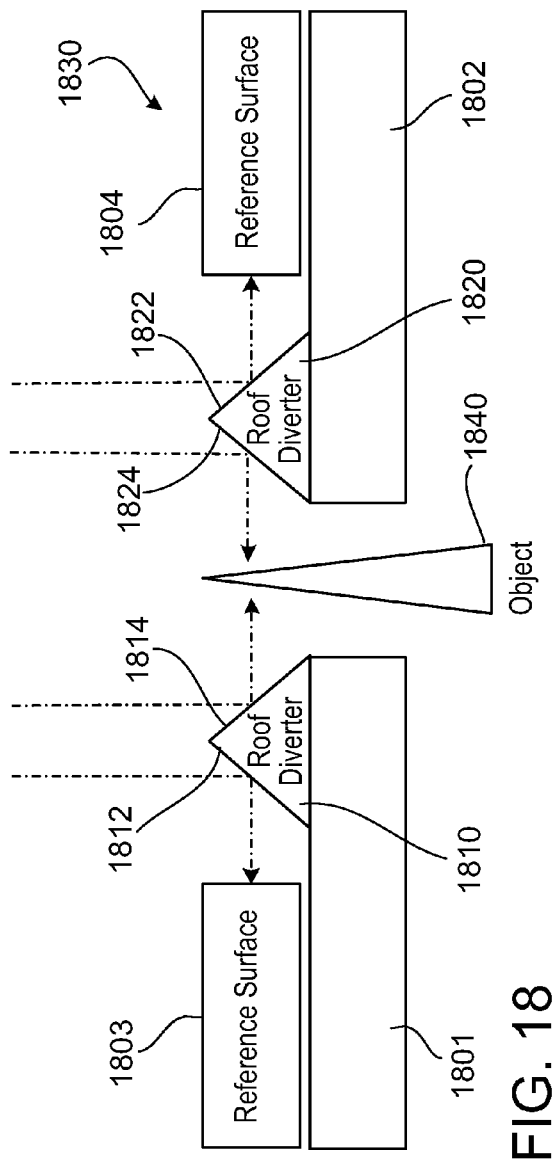
FIG. 18 is a schematic diagram of a target fixture.

FIG. 18 is a schematic diagram of an example fixture 1830 in which fixture reference surfaces are located outside a region of interest. In the example, roof diverters 1810, 1820 (e.g., mirrors) are positioned on a first fixture part 1801 and second fixture part 1802, respectively. Roof diverters 1810, 1820 each include two reflective surfaces angled with respect to a horizontal plane. With respect to roof diverter 1810, a first reflective surface 1812 directs incident measurement radiation from an optical profiler (not shown) toward a fixture reference surface 1803 where the measurement radiation is reflected back to surface 1812 and then to the optical profiler. A second reflective surface 1814 directs incident measurement radiation from the optical profiler toward a test object 1840 where the light is redirected back to surface 1814 and then to optical profiler again. Similarly, roof diverter 1820 includes a first reflective surface 1822 and second reflective surface 1824 for redirecting light to or from a fixture reference surface 1804 and test object 1840, respectively. The roof diverters can be secured to the fixture or, alternatively, they can be integrally formed with the fixture as a single contiguous feature. The roof diverters can be formed from glass having an aluminum coating to form the reflective surfaces or they can be formed from a polished metal. Other material may be used for roof diverters as well.

Figure 19:
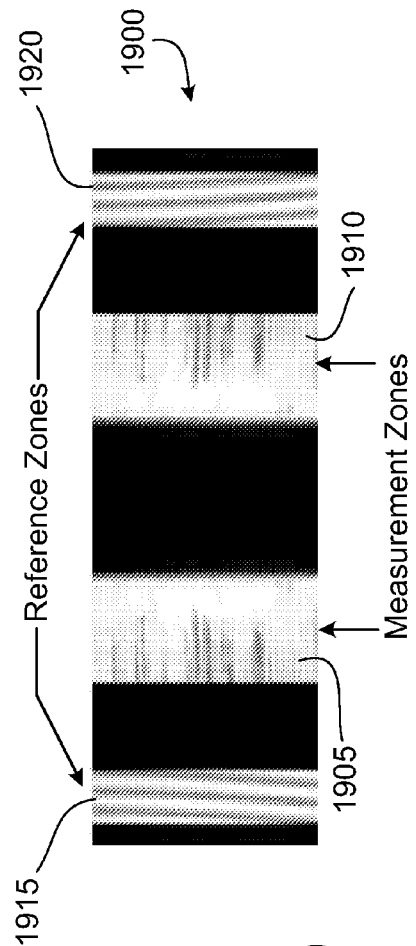
FIG. 19 is an example image of interference pattern that can result from using an optical profiling system having the arrangement shown in FIG. 18.

FIG. 19 is an example image 1900 of interference patterns that can result from using an optical profiling system having the arrangement shown in FIG. 18. The interference patterns were produced as a simulation using MATLAB® programming software. Image 1900 includes first sub-image 1905 and second sub-image 1910 that correspond to interference patterns produced by the combination of an optical profiler reference beam and measurement beams that have reflected off opposite sides of test object 1840. Sub-images 1915 and 1920 correspond to interference patterns produced by the combination of the optical profiler reference beam and measurement beams that have reflected off of fixture reference surfaces 1803, 1804, respectively.

Other embodiments of the optical profiler system are also possible. For example, in some embodiments, the optical profiler system can be used to characterize thin films that are formed on the test object, in addition to the surface profiling measurements described above. The thin film characterization can include determining a thickness (e.g., thickness uniformity), refractive index or surface profile of each thin film formed on the test object. Alternatively, or in addition, the thin film characterization can include determining a profile of the interface between thin films or between a thin film and the test object.

Figure 22A:
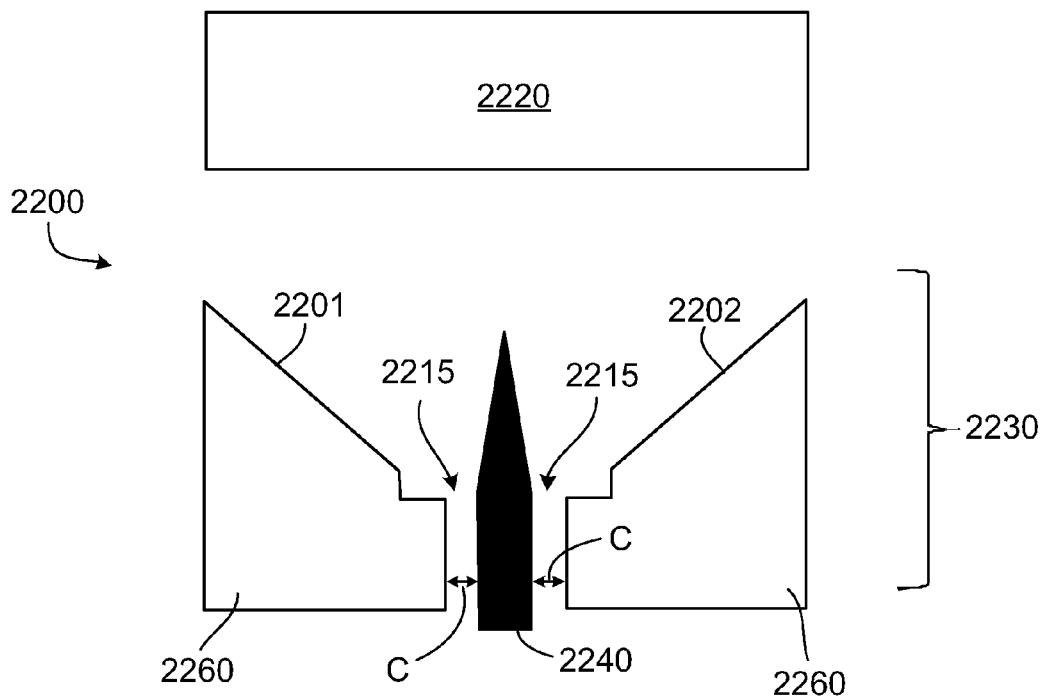
FIG. 22A is a schematic drawing of a portion of an optical profiling system.

Referring to FIG. 22A, a portion of an example optical profiling system 2200 for performing thin film characterization and surface profiling of a target 2230 is shown. A test object 2240 is held within a fixture 2260, where the test object 2240 includes one or more thin films that are at least partially transparent at the wavelength of incident light from the optical profiler 2220. The thin films can be formed as individual layers or as part of a multi-layer film on one or more surfaces of the test object 2240. The thin films can be deposited using deposition techniques such as physical or chemical vapor deposition or spin coating. In the present example, the optical profiler 2220 is a low coherence interferometer, although other interference microscopes can be used. The measurement light can be derived from a broadband light source (e.g., a white light source) or a monochromatic source.

As in previously described embodiments, measurement light from the optical profiler 2220 is directed toward the fixture 2260 and test object 2240. A measurement objective in the optical profiler 2220 illuminates fixture 2260 with measurement light and collects light from one or more surfaces of test object 2240. In particular, reflective surfaces 2201, 2202 on fixture 2260 re-direct the incident measurement toward sides of test object 2240. The measurement light then is reflected (or scattered or diffracted) from test object to the reflective surfaces 2201, 2202 where it is redirected back to the measurement objective of the optical profiler 2220. Due to the presence of one or more at least partially transparent thin films on the test object 2240, the incident light reflects off the surface of the topmost thin film as well as each optical interface.

Figure 22B:
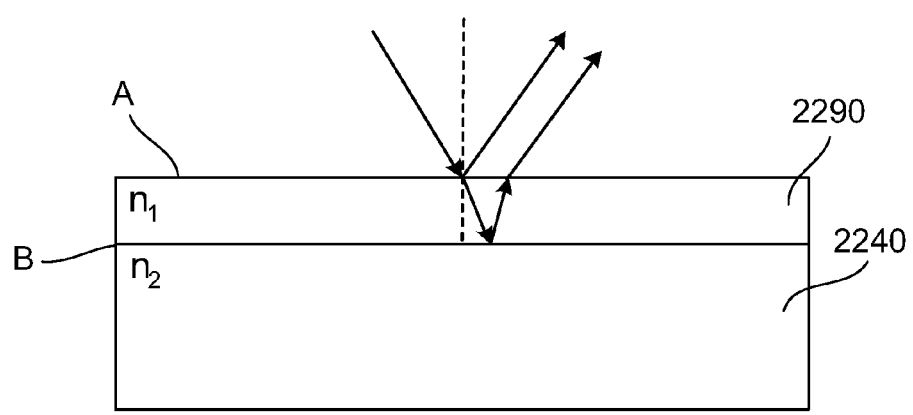
FIG. 22B is a schematic diagram of a cross-section of a test object.

For example, FIG. 22B shows a schematic cross-section of a portion of the test object 2240 on which a transparent thin film 2290 is formed, where the thin film 2290 will typically have a refractive index $n_1$ different from the refractive index $n_2$ of the test object 2240. Incident light from reflective surface 2202 reflects off the top surface A of thin film 2290 as well as from the interface B between thin film 2290 and test object 2240. The reflected light from interface A propagates back to optical profiler 2220 where it subsequently interferes with a reference beam on a corresponding point of a multi-element detector (not shown). Other points from surface A on test object 2240 are imaged in a similar manner.

A reference leg or a measurement leg of the optical profiling system is scanned over a specified distance to adjust an optical path length difference (OPD) between the measurement light and reference light. One approach for varying the OPD is to adjust the length of a reference path. In general, the length of a reference path corresponds to the distance that a reference beam travels in the optical profiler. The length of the reference path can be adjusted, for example, by scanning the position of a reference mirror (e.g., see reference mirror 504 in FIG. 5) relative to a reference objective. Alternatively, the position of the test object 2240 in a fixture gap 2215 can be scanned laterally with respect to the edges of the fixture 2260. For example, a piezoelectric transducer can be coupled to a mount for the test object 2240 to horizontally translate a position of the test object 2240 (where lateral motion is depicted by arrows C in gap 2215). Similarly, a transducer could be coupled to the fixture 2260 instead to translate a position of fixture 2260 relative to the test object 2240.

Scanning interferometry signals are acquired from each pixel of the multi-element detector during the scanning A modulation occurs in the scanning interferometry signal when the OPD between reference and measurement light at a detector is less than the coherence length of the light. Typically, the OPD is scanned over a distance comparable to or greater than this coherence length. As a result, the scanning interferometry signal includes modulations (fringes) that result from both the surface of thin film 2290 and the interface between thin film 2290 and test object 2240. These scanning interference signals can be analyzed to provide information about the relative location of the thin film surface or thin film-test object interface at each pixel and/or to provide information about the thickness and/or refractive index of thin film 2290 at each pixel. For example, the region of peak fringe contrast in each scanned interferometry signal may provide an initial estimate of the position of the corresponding interface in the sample relative to the corresponding fringe peak contrast in other signals. The location of peak fringe contrast can be determined using conventional techniques such as frequency domain analysis.

Additional information and implementations of the foregoing thin film characterization techniques can be found in U.S. Pat. Nos. 7,139,091, 7,324,210, 7,321,431, 7,315,382, 7,403,289, 7,564,566, 7,468,799, 7,812,963, each of which is incorporated by reference herein in its entirety.

An important aspect of analyzing parts, such as blades, for quality control is determining the location of the sharp edge of the blade so the blade manufacturer can identify the blade angle and thickness at various distances from the blade tip. Such measurements may require providing the location of the blade tip with high accuracy. In some embodiments, the location of the object tip is performed by analyzing the intensity of background light in the image recorded by the multi-element detector. In particular, a portion of the measurement light incident on a reflective surface of the fixture is redirected so that it passes above the top-most surface of the object. The measurement light then is redirected by the opposite reflective surface of the fixture so that it re-enters the objective of the optical profiler, creating a bright background in the recorded image. The electronic processor can use image processing software to identify the transition to the bright background and thus determine the position of the top-most edge of the test object being imaged.

Figure 23A:
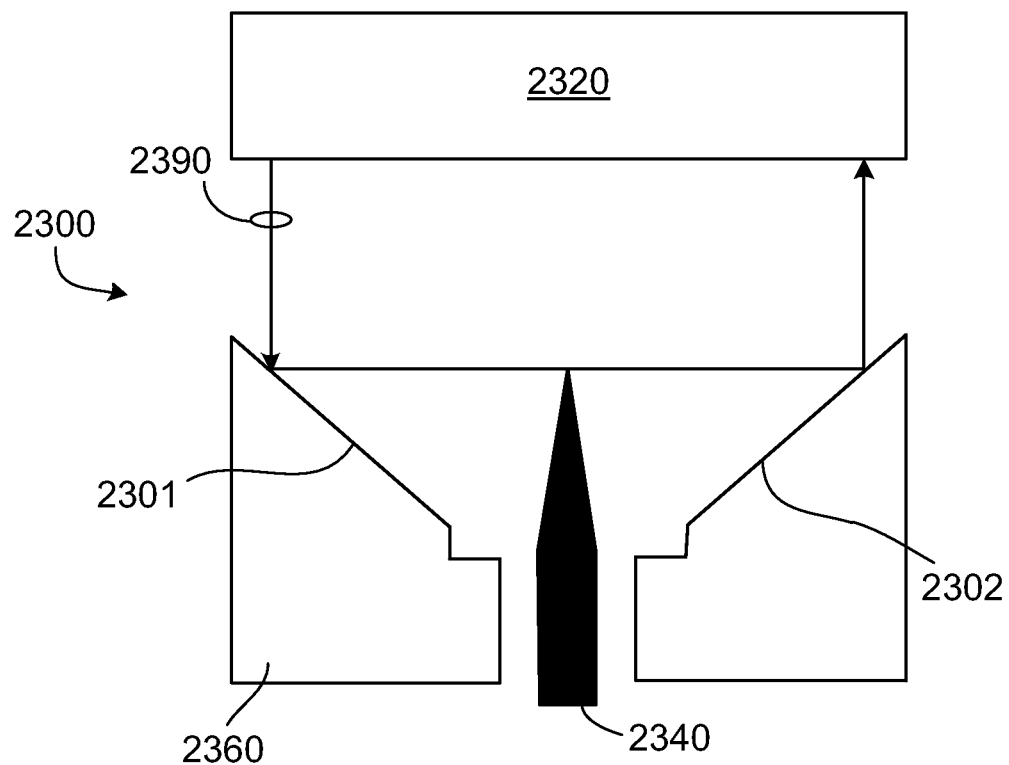
FIG. 23A is a schematic drawing of a portion of an optical profiling system.
Figure 23B:
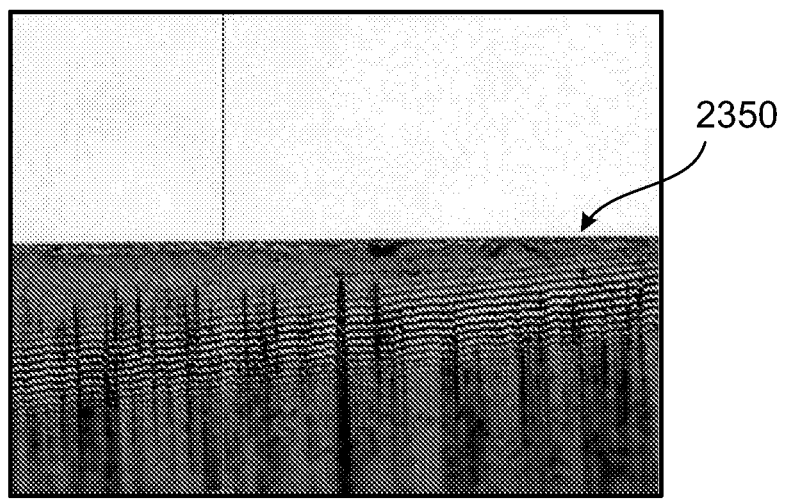
FIG. 23B is an example image recorded by an optical profiling system.

For example, referring to FIG. 23A, an optical profiling system 2300 is shown in which a portion 2390 of incident measurement light from optical profiler 2320 reflects off first reflective surface 2301 of fixture 2360, passes above a top-most edge of test object 2340, and is reflected back by second reflective surface 2302 towards optical profiler 2320. An example of the image recorded by a detector is shown in FIG. 23B, where the top-most edge of test object 2340 is identified corresponds to the transition 2350 from the bright background. In some implementations, the light from optical profiler 2320 is provided by a backlight source that is separate from the source providing the measurement light.

In general, any of the analysis methods described above can be implemented in computer hardware or software, or a combination of both. For example, in some embodiments, an electronic processor (e.g., electronic processor 450) can be part of a module that can be installed in a computer and connected to one or more optical profilers and configured to perform analysis of signals from the optical profilers. Analysis can be implemented in computer programs using standard programming techniques following the method and figures described herein. Program code is applied to input data to perform the functions described herein and generate output information. The output information is applied to one or more output devices such as a display monitor. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits preprogrammed for that purpose.

Each such computer program is preferably stored on a storage medium or device (e.g., ROM or magnetic diskette) readable by a general or special purpose programmable computer, for configuring and operating the computer when the storage media or device is read by the computer to perform the procedures described herein. The computer program can also reside in cache or main memory during program execution. The analysis methods can also be implemented as a computer-readable storage medium, configured with a computer program, where the storage medium so configured causes a computer to operate in a specific and predefined manner to perform the functions described herein.

Safety Razor Blade Manufacturing Applications

As discussed previously, the optical profiler system can be especially useful in razor blade manufacturing applications. Razor blades are typically made from a continuous strip of material such as steel that can be hardened and/or sharpened as the strip is translated along a processing line. The strip is divided into separate individual blades, which are subjected to additional optional processing including, but not limited to, further heat treatment, grinding, polishing, bending, welding to other components, and/or the application of coatings to improve hardness, durability and shaving comfort. To determine whether the blades meet desired standards such as curvature, sharpness, and thickness, the blades may be checked at one or more points during the foregoing fabrication process.

Optical profiler systems described above can be used to precisely measure geometric information about the blades at one or more stages of the fabrication process. For example, the profiler system can be positioned as a structure at one or more positions along the processing line to evaluate the quality of at least some of the blades or each blade that is produced from the original continuous strip. The blades may be held stationary in position between a fixture similar to fixture 660 for a defined period of time while the optical profiler analyzes the geometric properties of the blade. Alternatively, the optical profiler may analyze the geometric properties of the blades as the blades are passed through the fixture. In some implementations, the optical profiler may even be used to evaluate the quality of the continuous strip prior to formation of the blades.

Figure 20:
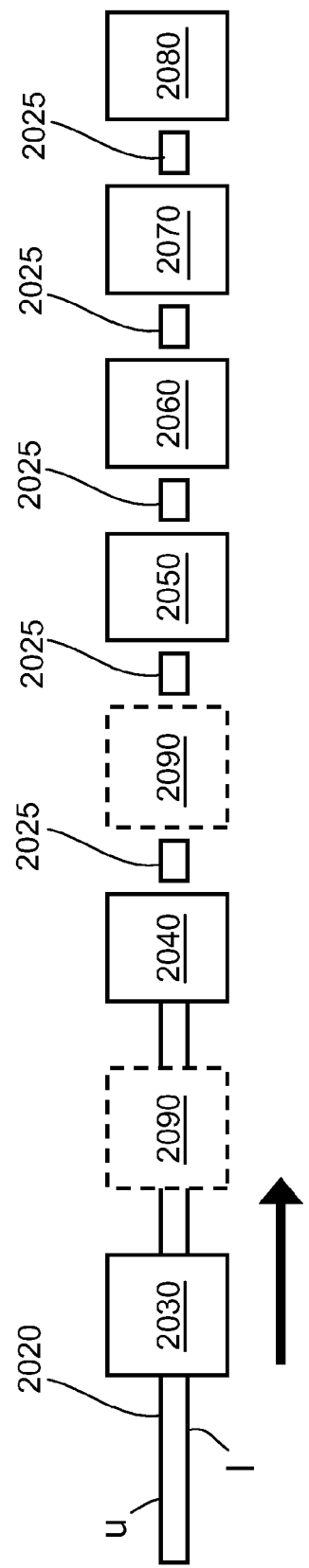
FIG. 20 is a schematic diagram of an example razor blade manufacturing system.

An example of a razor blade manufacturing system 2000 using a profiler apparatus 2090 is shown in FIG. 20. The profiler apparatus 2090 is used to precisely measure geometric properties of razor blades produced by system 2000. As shown in FIG. 20, the blades are generally manufactured by providing an elongated strip 2020 of metallic material, such as steel or any similar composite, and running the strip 2020 through one or more workstations. Strip 2020 may have a thickness between about 0.002 inch and about 0.006 inch and a width sufficient to provide a razor blade element after additional processing (discussed below) is performed. Elongated strip 2020 moves lengthwise in direction L and has upper (u) and lower (l) surfaces. Strip 2020 may be part of a continuous sheet of material or provided in separate individual sections.

Initially, elongated strip 2020 is passed through a sharpening workstation 2030. Sharpening workstation 2030 can include one or more sharpening tools, such as grinding or filing tools, to sharpen an exposed edge of strip 2020 (such as upper surface or lower surface) and provide strip 2020 with a cutting edge. The sharpening process can include forming a beveled region on the exposed edge or tapering the exposed edge. In some cases, the sharpening workstation 2030 can include a die-stamp combination to form the appropriate cutting edge shape. Prior to entering sharpening workstation 2030 or subsequent to the sharpening process, strip 2020 may pass through a heat treatment workstation (not shown) which can be used to perform additional annealing of the strip material, as needed.

After sharpening, the elongated strip 2020 is passed through a stamping workstation 2040. Stamping workstation 2040 can include one or more combinations of die-stamp devices to form a plurality of unitary discrete blade elements 2025. In particular, elongated strip 2020 is chopped into blade length sections, each of which includes a blade edge formed from the sharpened edge of the elongated strip 2020. In conjunction with or prior to forming the blade length sections, additional patterns and/or apertures may be cut out of each blade length section where the cut-out portions/apertures may be used for mounting the blade to a razor or assembling with other razor component. In some implementations, the blade elements 2025 are each welded to an additional support member, such as a separate thin sheet of metal.

The discrete blade elements 2025 are generally deposited into a vibratory feeder 2050, which is effective to align the discrete blade elements 2025 onto a track. At this point, the discrete blade elements 2025 can be assembled into a razor device. The blade elements 2025 then can be mounted into a plastic cartridge having one or more slots for each blade in order to form a cartridge assembly. The finished cartridge assembly can then be attached to a razor handle during subsequent operations or it can be packaged separately.

Alternatively, the blade elements 2025 can be passed onto one or more other workstations for additional processing. For example, the blade elements 2025 can be passed on to a bending workstation 2060 that serves to bend each blade element a fixed amount to provide the blade element with a desired curvature.

Alternatively, or in addition, the discrete blade elements 2025 may be passed on to a coating workstation 2070 that serves to deposit a layer of material (e.g., polytetrafluoroethylene) on the surface of the blade elements 2025 in order to increase blade strength and/or resistance to corrosion and wear. The coating can be deposited for example using a vapor deposition process such as physical or chemical vapor deposition. The discrete blade elements 2025 may also be passed on to a polishing workstation 2080 that includes washing and/or polishing tools to clean material off blade elements prior to assembly in a razor.

The razor blade manufacturing process can be automated and may include any necessary control electronics for operating the various workstations. It should be noted that the foregoing order in which the workstations are arranged can be varied as desired by the manufacturer. For example, the coating workstation 2070 can be located prior to the sharpening workstation 2030 along the processing line. Similarly, the bending workstation 2060 can be located after the coating workstation 2070.

Finished blade elements typically must conform to tight specifications before they are assembled into a razor or razor cartridge. For example, blade elements may be required to meet a designated thickness rating, taper angle, and curvature. In some embodiments of the razor blade manufacturing system, one or more of the optical profiler systems described previously can be used to check the blade elements during the manufacturing process to determine whether the critical dimensions have been met. Blades that meet the required specifications are retained and assembled into a final product. Blade elements that do not meet the required specifications are disposed. The profiler systems can be placed at various points along the processing line. For example, an optical profiler system 2090 can be provided at the exit of the sharpening workstation 2030 to examiner the quality of recently formed cutting edges. Alternatively, or in addition, an optical profiler system 2090 may be located at the exit of the stamping workstation 2040 to evaluate the geometric profile of blade elements produced by the stamping process. Additional optical profiler systems also may be located at other positions along the processing line.

Figure 21:
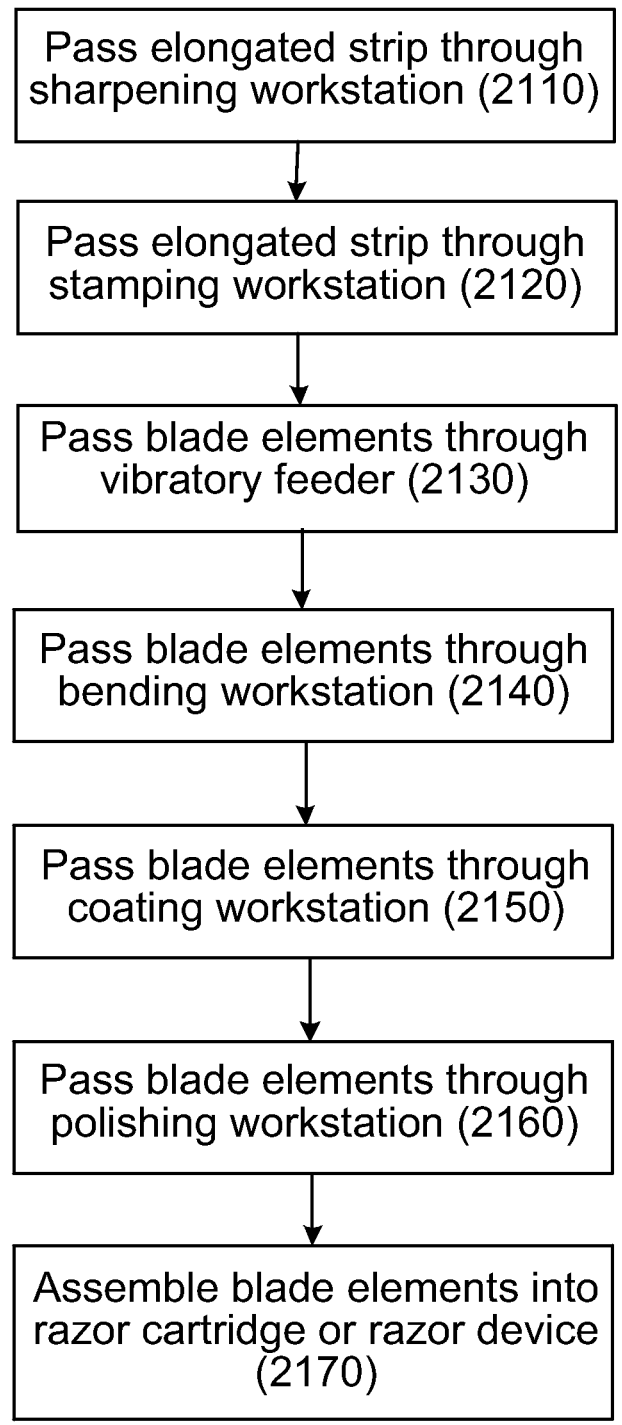
FIG. 21 is a flow chart of a method of manufacturing a razor blade element described with respect to FIG. 20.

FIG. 21 is a flow chart of a method of manufacturing a razor blade element described with respect to FIG. 20, where the method employs an optical profiler to analyze one or more geometric properties of the blade element as the blade element is processed. FIG. 21 includes the steps of: passing an elongated strip of material through a sharpening workstation (2110) to provide a cutting edge on the elongated strip; passing the elongated strip having the cutting edge through a stamping workstation (2120) to provide one or more separate blade elements; passing each blade element through a vibratory feeder to align the blade elements (2130); passing the aligned blade elements to a bending workstation to bend each blade element a desired amount (2140); passing each bent blade element to a coating workstation (2150) to coat the blade elements with additional protective material; passing the coated blade elements to a polishing workstation (2160) to clean the blade elements for assembly; and assembling the blade elements into a razor cartridge or razor device (2170). After each of the foregoing steps, an optical profiler can optionally be used to analyze the elongated strip/blade element to determine whether to keep or dispose of the strip/blade element.

The optical profiler system described above can also be used in other applications for which the geometric properties of a part wish to be measured precisely. For example, the optical profiler may be useful to analyze the surface properties and thicknesses of blade elements used as utensils, in surgical procedures, or as tools (e.g., saw blades).

Other embodiments are within the scope of the following claims.

What is claimed is:

1. A method for determining spatial information about a part,
the method comprising:
positioning the part in a fixture comprising two reference surfaces, where the part is positioned between the two reference surfaces;
imaging the two reference surfaces and opposing surfaces of the part to different locations of a multi-element detector, wherein imaging comprises forming images of the reference and opposing surfaces at the multi-element detector;
simultaneously acquiring the images of the opposing surfaces of the part and the two reference surfaces using the multi-element detector; and
determining spatial information about the part based on the simultaneously acquired images.

2. The method of claim 1, wherein the part is a tapered element.

3. The method of claim 2, wherein the tapered element is a razor blade.

4. The method of claim 1, wherein imaging the two reference surfaces and opposing surfaces of the part to different locations of the multi-element detector comprises deriving measurement light and reference light from a common light source, directing the measurement and reference light along different paths, where the fixture is positioned in the path of the measurement light, and combining the measurement and reference light on the multi-element detector.

5. The method of claim 4, wherein the opposing surfaces of the part comprise a first surface and a second surface opposing the first surface, and
wherein imaging the opposing surfaces of the part further comprises:
directing a first portion of the measurement light to the first surface; and
directing a second portion of the measurement light to the second surface.

6. The method of claim 5, further comprising:
directing the first portion of the measurement light along a direction of a local surface normal of the first surface; and
directing the second portion of the measurement light along a direction of a local surface normal of the second surface.

7. The method of claim 1, wherein determining the spatial information comprises correcting for variations of the relative position of the fixture with respect to the detector based on calibration information.

8. The method of claim 7, wherein the calibration information is determined from a calibration procedure that comprises:
positioning a calibration artifact in the fixture;
simultaneously acquiring images of opposing sides of the calibration artifact and the two reference surfaces using the multi-element detector; and
determining the calibration information based on the simultaneously acquired images of the opposing sides of the calibration artifact.

9. The method of claim 8, wherein the calibration information comprises information about the relative locations of the reference surfaces with respect to the opposing surfaces of the part.

10. The method of claim 8, wherein the two references and opposing surfaces of the part are imaged to the multi-element detector using an imaging profiler and the calibration information comprises information about imperfections in the imaging profiler.

11. The method of claim 1, wherein the opposing surfaces of the part define an edge and the spatial information comprises the location of the edge with respect to other spatial information about the part.

12. The method of claim 11, wherein the spatial information comprises the location of the edge with respect to a thickness profile of the part or with respect to surface profiles of the opposing surfaces of the part.

13. The method of claim 1, wherein the fixture comprises one or more additional reference surfaces separate from the first two reference surfaces, where the imaging comprises imaging the one or more additional reference surfaces to the multi-element detector.

14. The method of claim 13, wherein the additional reference surfaces comprise two adjacent reference surfaces having different orientations, the two adjacent reference surfaces being rigidly attached to one of the first two reference surfaces.

15. The method of claim 14, wherein the determining comprises accounting for motion between different portions of the fixture based on the images of the two adjacent reference surfaces.

16. The method of claim 1, wherein the two references and opposing surfaces of the part are imaged to the multi-element detector using an imaging profiler.

17. The method of claim 16, wherein the imaging profiler is an interferometric imaging profiler.

18. The method of claim 17, wherein imaging the opposing surfaces of the part to the multi-element detector comprises reflecting light from the opposing surfaces towards the imaging profiler.

19. The method of claim 1, wherein the spatial information comprises a thickness profile of the part.

20. The method of claim 1, wherein the spatial information comprises a thickness profile of a thin film on at least one of the opposing surfaces of the part.

21. The method of claim 1, wherein the spatial information comprises a profile of an interface between the part and a first thin film on the part or an interface between the first thin film and a second thin film on the part.

22. The method of claim 1, wherein the spatial information comprises surface profiles of the opposing surfaces of the part.

23. The method of claim 1, further comprising determining a refractive index of a thin film on the part.

24. A method for determining spatial information about a blade, the method comprising:
simultaneously acquiring images of opposing sides of the blade and images of at least two reference surfaces, wherein acquiring images comprises forming images of the opposing sides and the at least two reference surfaces at a multi-element detector; and
determining spatial information about the blade based on the simultaneously acquired images of the opposing sides of the blade and the at least two reference surfaces;
wherein the spatial information comprises a thickness profile of the blade and surface profiles of the opposing sides of the blade.

25. The method of claim 24, wherein the blade is a razor blade.

26. The method of claim 24, wherein the spatial information comprises a thickness profile of a thin film on a surface of the blade.

27. The method of claim 24, wherein determining the spatial information comprises determining an orientation and/or position of a calibration plane based on the at least two reference surfaces.

28. The method of claim 27, further comprising identifying the calibration plane prior to acquiring the images of opposing sides of the blade and the images of the at least two reference surfaces.

29. An optical metrology system, comprising:
an imaging profiler comprising an optical assembly and a multi-element detector;
a fixture comprising two reference surfaces and configured to receive a part between the reference surfaces, the fixture being positioned relative to the optical assembly so that the optical assembly simultaneously images the two reference surfaces and opposing surfaces of the part to different locations of the multi-element detector by forming images of the two reference surfaces and opposing surfaces at the multi-element detector; and
an electronic processor in communication with the multi-element detector,
wherein the electronic processor is programmed to determine spatial information about the part based on the images of the two reference surfaces and the images of the opposing surfaces of the part.

30. The optical metrology system of claim 29, wherein the fixture comprises a first mirror and a second mirror, the first and second mirrors being configured to direct light from respective ones of the opposing surfaces of the part to the imaging profiler.

31. The optical metrology system of claim 29, wherein the two reference surfaces are separated by a space sized to receive the part.

32. The optical metrology system of claim 31, wherein the part is a tapered element.

33. The optical metrology system of claim 32, wherein the tapered element is a razor blade.

34. The optical metrology system of claim 32, wherein the opposing surfaces of the blade define an edge and the fixture is configured to orient the blade with the edge pointing towards the optical assembly.

35. The optical metrology system of claim 29, wherein the fixture comprises two mirrors, each positioned to reflect light from a respective one of the opposing surfaces of the part towards the optical profiler.

36. The optical metrology system of claim 35, wherein the two mirrors are arranged at 90° with respect to each other.

37. The optical metrology system of claim 35, wherein the two mirrors are each configured to direct light along a direction of a local surface normal of a respective one of the opposing surfaces.

38. The optical metrology system of claim 35, wherein each of the mirrors is rigidly attached to a corresponding reference surface.

39. The optical metrology system of claim 35, wherein the two reference surfaces are positioned between the mirrors.

40. The optical metrology system of claim 35, wherein the fixture comprises one or more additional reference surfaces separate from the first two reference surfaces positioned so that the optical assembly images the one or more additional reference surfaces to the multi-element detector.

41. The optical metrology system of claim 40, wherein the additional reference surfaces comprise two adjacent reference surfaces having different orientations, the two adjacent reference surfaces being rigidly attached to one of the first two reference surfaces.

42. The optical metrology system of claim 29, wherein the opposing surfaces of the part are non-coplanar with the reference surfaces.

43. The optical metrology system of claim 29, wherein the imaging profiler is selected from the group consisting of scanning white light interference microscopes, imaging interference microscopes, phase-shifting interference microscopes, confocal microscopes, chromatic confocal microscopes, structured-light microscopes, focus sensors, and triangulation sensors.

44. The optical metrology system of claim 29, wherein the fixture is configured to hold multiple parts and the system comprises an actuator configured to translate the fixture relative to the optical assembly.

45. A method for manufacturing a razor blade assembly, comprising:
providing a razor blade;
determining spatial information about the razor blade, wherein determining the spatial information includes
positioning the razor blade in a fixture comprising two reference surfaces, where the razor blade is positioned between the two reference surfaces,
imaging the two reference surfaces and opposing surfaces of the razor blade to different locations of a multi-element detector,
simultaneously acquiring images of the opposing surfaces of the razor blade and the two reference surfaces using the multi-element detector, and
obtaining the spatial information about the razor blade based on the simultaneously acquired images, or
wherein determining the spatial information includes
simultaneously acquiring images of opposing surfaces of the razor blade and at least two reference surfaces, and
obtaining the spatial information about the razor blade based on the simultaneously acquired images of the opposing surfaces and the at least two reference surfaces wherein acquiring images of the opposing surfaces and the reference surfaces comprises forming images of the reference and opposing surfaces at the multi-element detector; and assembling the razor blade with one or more additional elements to form the razor blade assembly, wherein the spatial information comprises a thickness profile of the razor blade and surface profiles of the opposing surfaces of the razor blade.

46. The method of claim 45, further comprising:

providing one or more additional razor blades;

determining spatial information about the one or more additional razor blades, wherein determining the spatial information includes positioning the one or more additional razor blades in a fixture comprising two reference surfaces, where the razor blade is positioned between the two reference surfaces, imaging the two reference surfaces and opposing surfaces of the razor blade to different locations of the multi-element detector, simultaneously acquiring images of the opposing surfaces of the razor blade and the two reference surfaces using the multi-element detector, and obtaining the spatial information about the razor blade based on the simultaneously acquired images, or wherein determining the spatial information includes simultaneously acquiring images of opposing surfaces of the razor blade and at least two reference surface, and obtaining the spatial information about the razor blade based on the simultaneously acquired images of the opposing surfaces and the at least two reference surfaces; and excluding one or more of the additional razor blades from the razor blade assembly based on the spatial information about the one or more additional razor blades.

* * * * *